United States Patent
Islam et al.

(10) Patent No.: US 11,115,944 B2
(45) Date of Patent: Sep. 7, 2021

(54) TIMING SYNCHRONIZATION WITH NEIGHBOR NODES DIFFERENT FROM PARENT NODES

(71) Applicant: QUALCOMM Incorporated, San Diego, CA (US)

(72) Inventors: Muhammad Nazmul Islam, Littleton, MA (US); Navid Abedini, Somerset, NJ (US); Samel Celebi, West New York, NJ (US); Tao Luo, San Diego, CA (US); Jianghong Luo, Skillman, NJ (US); Karl Georg Hampel, Hoboken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 16/564,806

(22) Filed: Sep. 9, 2019

(65) Prior Publication Data

US 2020/0112929 A1 Apr. 9, 2020

Related U.S. Application Data

(60) Provisional application No. 62/742,794, filed on Oct. 8, 2018.

(51) Int. Cl.
*H04W 56/00* (2009.01)
*H04W 74/08* (2009.01)
(Continued)

(52) U.S. Cl.
CPC ......... *H04W 56/001* (2013.01); *H04L 1/0061* (2013.01); *H04L 1/0072* (2013.01);
(Continued)

(58) Field of Classification Search
CPC ..... H04L 5/0053; H04L 5/005; H04L 5/0044; H04L 5/0007; H04L 5/0035;
(Continued)

(56) References Cited

U.S. PATENT DOCUMENTS

2017/0331577 A1* 11/2017 Parkvall ............ H04L 29/06231
2018/0092139 A1 3/2018 Novlan et al.
(Continued)

FOREIGN PATENT DOCUMENTS

WO WO-2012153960 A2 11/2012

OTHER PUBLICATIONS

AT & T: Summary of 7.2.3.1 Enhancements to Support NR Backhaul Links, 3GPP Draft; R1-1809857, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 20, 2018-Aug. 24, 2018, Aug. 23, 2018, XP051517214, 21 pages, Retrieved from the Internet: URL: http://www.3gpp.org/ftp/tsg%5Fran/WG1%5FRL1/TSGR1%5F94/Docs/R1%2D1809857%2Ezip [retrieved on Aug. 23, 2018] the whole document.
(Continued)

*Primary Examiner* — Jung Liu
(74) *Attorney, Agent, or Firm* — QUALCOMM Incorporated

(57) ABSTRACT

Methods, systems, and devices for wireless communications are described. A first node of an integrated access and backhaul (IAB) network may identify a second, neighboring non-parent node of the IAB network. The second node may be associated with a timing source which may provide more accurate timing information than the parent node of the first node. The first node may transmit a first random access message to the second node to initiate a random access procedure. The second node may transmit a second random
(Continued)

access message to the first node, the second random access message including timing information based on the timing source. The first and second nodes may terminate the random access procedure based at least in part on receiving the second random access message.

30 Claims, 13 Drawing Sheets

(51) Int. Cl.
    *H04L 1/00*         (2006.01)
    *H04W 72/04*     (2009.01)
    *H04L 29/12*     (2006.01)

(52) U.S. Cl.
    CPC ......... *H04L 61/35* (2013.01); *H04W 72/0413* (2013.01); *H04W 72/0446* (2013.01); *H04W 74/0833* (2013.01)

(58) Field of Classification Search
    CPC . H04L 5/0055; H04L 5/0057; H04L 12/2869; H04L 12/5695; H04L 47/00; H04L 47/70; H04L 47/78; H04L 47/821; H04L 47/827; H04W 72/0446; H04W 24/10; H04W 74/0833; H04W 16/14; H04W 74/08; H04W 72/04
    See application file for complete search history.

(56) References Cited

U.S. PATENT DOCUMENTS

| | | | |
|---|---|---|---|
| 2018/0262313 A1* | 9/2018 | Nam | H04L 5/005 |
| 2019/0174436 A1* | 6/2019 | da Silva | H04W 16/12 |
| 2019/0182785 A1* | 6/2019 | da Silva | H04W 16/28 |
| 2019/0200391 A1* | 6/2019 | Li | H04W 16/14 |
| 2019/0223157 A1* | 7/2019 | Hwang | H04W 74/0833 |

OTHER PUBLICATIONS

CATT: "NR Physical Layer Design for IAB Backhaul Link", 3GPP Draft; R1-1810538_IAB, 3rd Generation Partnership Project (3GPP), Mobile Competence Centre; 650, Route Des Lucioles; F-06921 Sophia-Antipolis Cedex; France, vol. RAN WG1, No. Chengdu, China; Oct. 8, 2018-Oct. 12, 2018, Sep. 29, 2018, XP051517946, 7 Pages, Retrieved from the Internet: URL: http://www.3gpp.org/ftp/tsg%5Fran/WG1%5FRL1/TSGR1%5F94b/Docs/R1%2D1810538 &2Ezip [retrieved on Sep. 29, 2018] the whole document.
Huawei: "Overview on IAB", 3GPP Draft; R3-181998 Overview on IAB, 3rd Generation Partnership Project (3GPP), Mobile Competence Centre; 650, Route Des Lucioles; F-06921 Sophia-Antipolis Cedex; France, vol. RAN WG3, No. Sanya, China; Apr. 16, 2018-Apr. 20, 2018, Apr. 15, 2018, XP051430157, 9 Pages, Retrieved from the Internet: URL: http://www.3gpp.org/ftp/Meetings%5F3GPP%5FSYNC/RAN3/Docs/ [retrieved on Apr. 15, 2018] the whole document.
International Search Report and Written Opinion—PCT/US2019/050480—ISA/EPO—dated Dec. 6, 2019.

* cited by examiner

TIMING SYNCHRONIZATION WITH NEIGHBOR NODES DIFFERENT FROM PARENT NODES

CROSS REFERENCE

The present application for patent claims the benefit of U.S. Provisional Patent Application No. 62/742,794 by ISLAM et al., entitled "TIMING SYNCHRONIZATION WITH NEIGHBOR NODES DIFFERENT FROM PARENT NODES," filed Oct. 8, 2018, assigned to the assignee hereof, and expressly incorporated herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A node of an integrated access and backhaul (IAB) network may rely on its parent node for timing information. In some cases, the parent node of the IAB node may be far away from a reliable timing source and therefore may be unable to provide accurate timing information. Current techniques for synchronizing timing at an IAB node are inefficient and have many shortcomings.

SUMMARY

The described techniques relate to improved methods, systems, devices, and apparatuses that support timing synchronization with neighbor nodes different from parent nodes. Generally, the described techniques provide for improved node timing synchronization in an integrated access and backhaul (IAB) network. The IAB network may include anchor nodes and relay nodes providing access to a core network. A parent node of an IAB node may be used for timing synchronization of its child IAB node. However, if the parent node is far away from a timing source, the IAB node may receive timing information from a non-parent, neighboring node. For example, a first IAB node may determine its parent node is too far away from a timing source to provide reliable timing and synchronization signaling. The first IAB node may identify a second IAB node which is closer or connected to a timing source. The first IAB node may transmit a first random access message to the second IAB node. The second IAB node may transmit a second random access message to the first IAB node including timing and synchronization information. Generally, a random access message like the first random access message may be transmitted to initiate a handover procedure or a connection procedure. However, the first IAB node may have transmitted the first random access message to receive the timing information, not as part of a handover. Therefore, the first IAB node and second IAB node may determine that the first random access message was transmitted just for the timing and synchronization information and terminate the random access procedure. In some cases, the first IAB node may transmit a connection termination request after receiving the timing information. In some cases, the network may indicate to the second IAB node that the first random access message was transmitted to receive the timing information and not to establish a connection. The second IAB node may then transmit a connection termination indication in the second random access message or in a later message to the first IAB node.

A method of wireless communication is described. The method may include identifying, at a first node of a wireless communications system, a second node of the wireless communications system, where the second node is a neighbor of the first node and is different from a parent node of the first node, the second node is associated with a timing source, transmitting a first random access message to the second node to initiate a random access procedure, receiving a second random access message from the second node, the second random access message including timing information based on the timing source, and terminating the random access procedure based on receiving the second random access message.

An apparatus for wireless communication is described. The apparatus may include a processor, memory coupled with the processor, and instructions stored in the memory. The instructions may be executable by the processor to cause the apparatus to identify, at a first node of a wireless communications system, a second node of the wireless communications system, where the second node is a neighbor of the first node and is different from a parent node of the first node, the second node is associated with a timing source, transmit a first random access message to the second node to initiate a random access procedure, receive a second random access message from the second node, the second random access message including timing information based on the timing source, and terminate the random access procedure based on receiving the second random access message.

Another apparatus for wireless communication is described. The apparatus may include means for identifying, at a first node of a wireless communications system, a second node of the wireless communications system, where the second node is a neighbor of the first node and is different from a parent node of the first node, the second node is associated with a timing source, transmitting a first random access message to the second node to initiate a random access procedure, receiving a second random access message from the second node, the second random access message including timing information based on the timing source, and terminating the random access procedure based on receiving the second random access message.

A non-transitory computer-readable medium storing code for wireless communication is described. The code may include instructions executable by a processor to identify, at a first node of a wireless communications system, a second node of the wireless communications system, where the second node is a neighbor of the first node and is different from a parent node of the first node, the second node is associated with a timing source, transmit a first random access message to the second node to initiate a random access procedure, receive a second random access message from the second node, the second random access message including timing information based on the timing source, and terminate the random access procedure based on receiving the second random access message.

In some examples of the method, apparatuses, and non-transitory computer-readable medium described herein, terminating the random access procedure further may include operations, features, means, or instructions for transmitting a third message to the second node, where the third message includes a request for the termination of the random access procedure.

Some examples of the method, apparatuses, and non-transitory computer-readable medium described herein may further include operations, features, means, or instructions for receiving a control channel message scheduling the third message, where cyclic redundancy check (CRC) bits of the control channel message may be scrambled by a random access radio network temporary identifier (RNTI) or a temporary cell RNTI.

In some examples of the method, apparatuses, and non-transitory computer-readable medium described herein, the third message includes one or more of a radio resource control (RRC) connection request message or an RRC connection setup complete message.

Some examples of the method, apparatuses, and non-transitory computer-readable medium described herein may further include operations, features, means, or instructions for receiving a RRC connection setup message from the second node and transmitting an uplink message after receiving the RRC connection setup message, where the uplink message includes a request for the termination of the random access procedure.

In some examples of the method, apparatuses, and non-transitory computer-readable medium described herein, transmitting the first random access message further may include operations, features, means, or instructions for transmitting the first random access message with a preamble that may be associated with the termination of the random access procedure.

Some examples of the method, apparatuses, and non-transitory computer-readable medium described herein may further include operations, features, means, or instructions for receiving an indication of the termination of the random access procedure from the second node, where the indication may be received via one or more of a downlink control channel associated with the second random access message, a downlink shared channel associated with the second random access message, a downlink control channel associated with a third message, a downlink control channel associated with a fourth message, or a downlink shared channel associated with the fourth message.

In some examples of the method, apparatuses, and non-transitory computer-readable medium described herein, the downlink control channel associated with the second random access message and the downlink shared channel associated with the second random access message may be scheduled with a random access RNTI, the downlink control channel of the third message may be scheduled with a temporary cell RNTI, or the downlink control channel of the fourth message and the downlink shared channel of the fourth message may be scheduled with the random access RNTI or the temporary cell RNTI.

In some examples of the method, apparatuses, and non-transitory computer-readable medium described herein, CRC bits of the second random access message may be scrambled by a random access RNTI.

Some examples of the method, apparatuses, and non-transitory computer-readable medium described herein may further include operations, features, means, or instructions for determining a timing advance command based on the timing information included in the second random access message.

Some examples of the method, apparatuses, and non-transitory computer-readable medium described herein may further include operations, features, means, or instructions for receiving, from a parent node, a list of nodes associated with a timing synchronization process, where the list of nodes includes the second node, and transmitting the first random access message may be based on the list of nodes.

Some examples of the method, apparatuses, and non-transitory computer-readable medium described herein may further include operations, features, means, or instructions for conveying to the second node that the first random access message was transmitted to receive the timing information and not for a handover.

In some examples of the method, apparatuses, and non-transitory computer-readable medium described herein, the timing source connected to the second node may be a Global Navigation Satellite System (GNSS) source.

A method of wireless communication is described. The method may include identifying, at a second node of a wireless communications system associated with a timing source, a first node of the wireless communications system, where the second node is a neighbor of the first node and the second node is different from a parent node of the first node, receiving a first random access message initiating a random access procedure from the first node, retrieving timing information from the timing source based on the first random access message and the random access procedure, transmitting a second random access message to the first node, the second random access message including the timing information from the timing source, and terminating the random access procedure based on transmitting the second random access message including the timing information.

An apparatus for wireless communication is described. The apparatus may include a processor, memory coupled with the processor, and instructions stored in the memory. The instructions may be executable by the processor to cause the apparatus to identify, at a second node of a wireless communications system associated with a timing source, a first node of the wireless communications system, where the second node is a neighbor of the first node and the second node is different from a parent node of the first node, receive a first random access message initiating a random access procedure from the first node, retrieve timing information from the timing source based on the first random access message and the random access procedure, transmit a second random access message to the first node, the second random access message including the timing information from the timing source, and terminate the random access procedure based on transmitting the second random access message including the timing information.

Another apparatus for wireless communication is described. The apparatus may include means for identifying, at a second node of a wireless communications system associated with a timing source, a first node of the wireless communications system, where the second node is a neighbor of the first node and the second node is different from a parent node of the first node, receiving a first random access message initiating a random access procedure from the first node, retrieving timing information from the timing source based on the first random access message and the random access procedure, transmitting a second random access message to the first node, the second random access message including the timing information from the timing source, and terminating the random access procedure based on transmitting the second random access message including the timing information.

A non-transitory computer-readable medium storing code for wireless communication is described. The code may include instructions executable by a processor to identify, at a second node of a wireless communications system associated with a timing source, a first node of the wireless communications system, where the second node is a neighbor of the first node and the second node is different from a parent node of the first node, receive a first random access message initiating a random access procedure from the first node, retrieve timing information from the timing source based on the first random access message and the random access procedure, transmit a second random access message to the first node, the second random access message including the timing information from the timing source, and terminate the random access procedure based on transmitting the second random access message including the timing information.

In some examples of the method, apparatuses, and non-transitory computer-readable medium described herein, terminating the random access procedure further may include operations, features, means, or instructions for receiving a third message from the first node, where the third message includes a request for the termination of the random access procedure.

Some examples of the method, apparatuses, and non-transitory computer-readable medium described herein may further include operations, features, means, or instructions for transmitting a control channel message scheduling the third message, where CRC bits of the control channel message may be scrambled by a random access RNTI or a temporary cell RNTI.

In some examples of the method, apparatuses, and non-transitory computer-readable medium described herein, the third message includes one or more of an RRC connection request message or an RRC connection setup complete message.

In some examples of the method, apparatuses, and non-transitory computer-readable medium described herein, terminating the random access procedure further may include operations, features, means, or instructions for transmitting an RRC connection setup message to the first node and receiving an uplink message from the first node after transmitting the RRC connection setup message, where the uplink message includes a request for the termination of the random access procedure.

In some examples of the method, apparatuses, and non-transitory computer-readable medium described herein, receiving the first random access message further may include operations, features, means, or instructions for identifying a preamble of the first random access message that may be associated with the termination of the random access procedure.

Some examples of the method, apparatuses, and non-transitory computer-readable medium described herein may further include operations, features, means, or instructions for transmitting an indication of the termination of the random access procedure to the first node, where the indication may be transmitted via one or more of a downlink control channel associated with the second random access message, a downlink shared channel associated with the second random access message, a downlink control channel associated with a third message, a downlink control channel associated with a fourth message, or a downlink shared channel associated with the fourth message.

In some examples of the method, apparatuses, and non-transitory computer-readable medium described herein, the downlink control channel associated with the second random access message and the downlink shared channel associated with the second random access message may be scheduled with a random access RNTI, the downlink control channel of the third message may be scheduled with a temporary cell RNTI, or the downlink control channel of the fourth message and the downlink shared channel of the fourth message may be scheduled with the random access RNTI or the temporary cell RNTI.

Some examples of the method, apparatuses, and non-transitory computer-readable medium described herein may further include operations, features, means, or instructions for scrambling CRC bits of the second random access message with a random access RNTI.

Some examples of the method, apparatuses, and non-transitory computer-readable medium described herein may further include operations, features, means, or instructions for indicating a timing advance command based on the timing information included in the second random access message.

Some examples of the method, apparatuses, and non-transitory computer-readable medium described herein may further include operations, features, means, or instructions for receiving an indication from the first node that the first random access message was transmitted to receive the timing information and not for a handover.

In some examples of the method, apparatuses, and non-transitory computer-readable medium described herein, the timing source connected to the second node may be a GNSS source.

DETAILED DESCRIPTION

Figure 1:
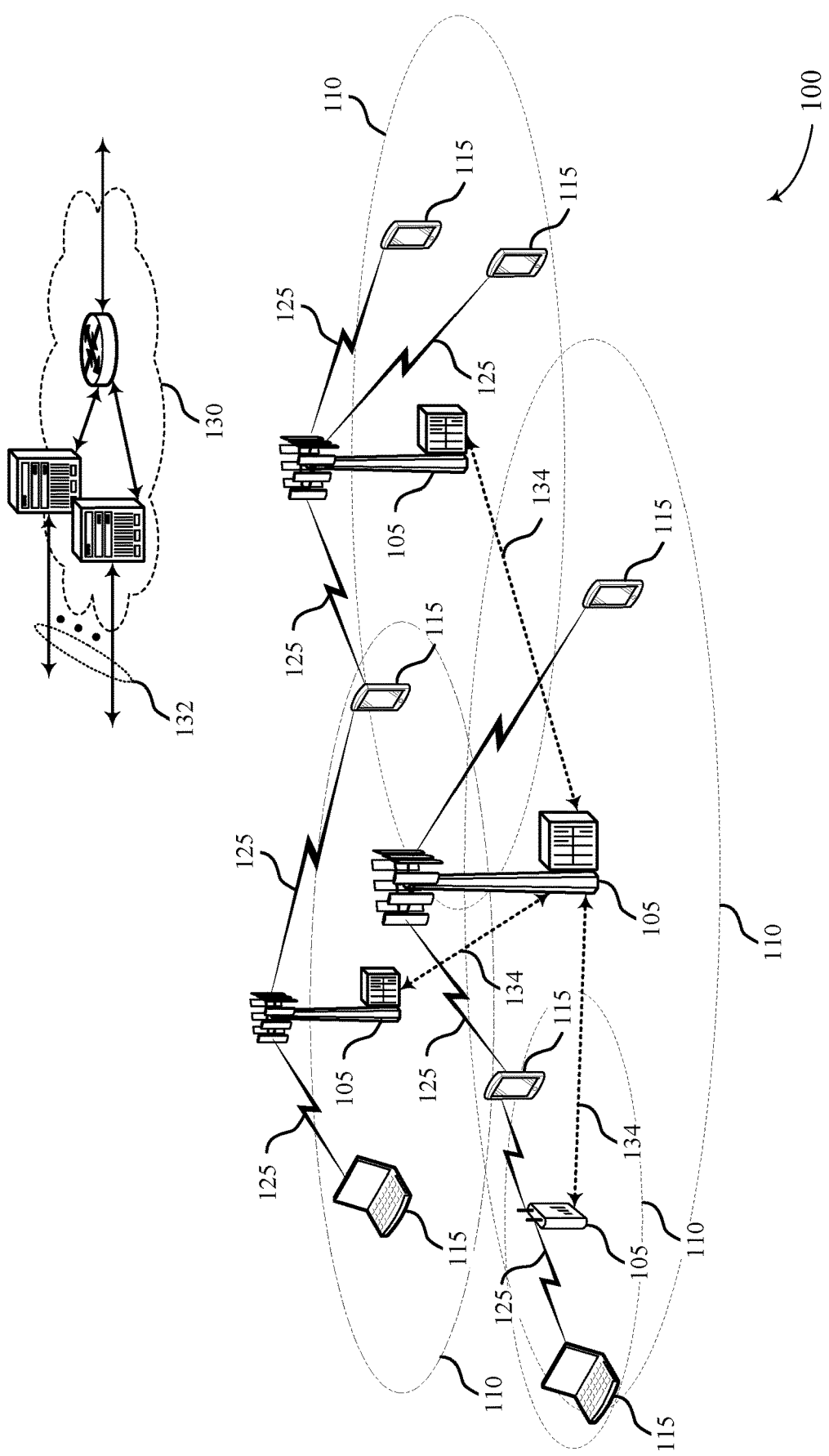
FIG. 1 illustrates an example of a wireless communications system that supports timing synchronization with neighbor nodes different from parent nodes in accordance with aspects of the present disclosure.

A wireless communications system (e.g., a New Radio (NR) system, a millimeter wave (mmW) system, etc.) may implement an integrated access and backhaul (IAB) network architecture. An IAB network may include a number of connected nodes to support network coverage, for example for a large geographic area. These IAB nodes may generally be referred to as base stations. A subset of these nodes may be donor or "anchor" nodes. An anchor node may be connected to the core network via a wireline backhaul connection. Additionally, the anchor node may connect to one or more "relay" nodes distributed throughout the IAB network via one or more wireless backhaul connections. These relay nodes may not be physically connected to the network with a wireline link, and instead may relay communications between user equipment (UEs) and anchor nodes using wireless backhaul links. UEs within the network coverage area may access the network via access links, where each access link supports communications between a UE and an IAB node (e.g., an anchor node or a relay node).

When a relay node is added to the IAB network, the relay node may perform an initial integration procedure to connect with an IAB node within the network. The relay node may form a wireless backhaul link with this IAB node and may send or receive backhaul messages over the link. In these cases, the relay node may be referred to as a "child" node, and the connected IAB node may be a "parent" node for the relay node. The parent node may transmit information from the core network downstream to the relay node, and the relay node may forward information received from UEs upstream to the parent node. In some cases, the parent node may be an example of an anchor node and may communicate with the core network directly (e.g., via a wireline link). In other cases, the parent node may be another relay node, and may itself be connected to an additional parent node. In this way, the IAB system may form chains of relay nodes (e.g., to support wide network coverage despite small cell nodes).

The IAB network may support over-the-air synchronization techniques. In a multi-hop IAB network with a hierarchical topology, an IAB node may synchronize to its parent nodes by tracking downlink receive timing and adjusting its uplink transmit timing using provided timing information, such as a timing advance command (TAC). The parent node may have been selected based on the parent node providing the highest reference signal receive power (RSRP) of candidate parent nodes or because that parent node provided the most load balanced configuration for the IAB network. As such, a reliable timing source may not have been as big of a factor when configuring a parent node for an IAB node. Therefore, the parent node may be multiple hops away from an actual timing source, and the parent node may not be a good source for timing information.

In some cases, a non-parent neighbor IAB node may be connected to a timing source or a timing synchronization resource. The non-parent neighbor node may be a better source of timing (e.g., higher timing accuracy) than the parent node. Therefore, a first IAB node and a second IAB node, where the second IAB node is connected to a timing source, may implement techniques for the second IAB node to provide updated timing and synchronization information to the first IAB node. For example, the first IAB node may transmit a first random access message including a random access preamble to the second IAB node. The second IAB node may transmit a second random access message in response and include the timing or synchronization information in the second random access message.

In some wireless communications systems, a random access preamble may be transmitted as part of a handover procedure or a connection procedure. However, the first IAB node may instead transmit the first random access message to receive the timing information and not for a handover or to connect to the second IAB node. The first IAB node and the second IAB node may implement techniques to convey that the first random access message was not transmitted as part of a handover or connection procedure. The first IAB node and the second IAB node may accordingly terminate the handover or connection procedure.

In some examples, the first IAB node may convey to the second IAB node that the random access message was transmitted to receive timing and synchronization information, not as part of a handover or connection request. For example, the first IAB node may transmit a message after receiving the timing information which requests termination of the connection or handover procedure.

In some cases, the second IAB node may convey termination of the handover procedure or connection procedure when transmitting the second random access message. For example, the second IAB node may transmit an indication of the random access procedure termination in the second random access message instead of the first IAB node transmitting the request for termination. In some cases, the network may inform the second IAB node that the first random access message was not transmitted as part of a connection or handover procedure. In some examples, the second IAB node may be configured with a set of random access preambles. Upon detection of one of the preambles in the configured set, the second IAB node may determine that the random access preamble was transmitted for timing information and not as part of a handover or connection procedure. In this example, the first IAB node may transmit one of the random access preambles from the configured set in the first message to indicate that the first message is transmitted to receive timing information and not as part of a handover or connection procedure. When the second IAB node receives the random access message, the second IAB node may transmit the second random access message to the first IAB node in response, but the second IAB node may include an indication of the termination as well. In some cases, the indication of the termination may be included in the second random access message or later messages transmitted by the second IAB node.

Particular aspects of the subject matter described herein may be implemented to realize one or more advantages. The described methods, systems, devices, and apparatuses provide techniques which may support timing synchronization with neighbor nodes different from parent nodes. As such, supported techniques may include features for a UE to receive updated timing information from a node which is closer (e.g., based on number of hops) to a timing source than the parent node of the UE, which may improve synchronization (e.g., timing accuracy) within an IAB network. The improved synchronization may provide for higher transmission accuracy, for example, which may result in less retransmissions stemming from transmission errors, and accordingly, power savings at the UE.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to timing synchronization with neighbor nodes different from parent nodes.

FIG. 1 illustrates an example of a wireless communications system 100 that supports timing synchronization with neighbor nodes different from parent nodes in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers (CCs) using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-S-OFDM).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that can support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The wireless communications system 100 (e.g., an NR system, a mmW system, etc.) may implement an IAB network architecture. An IAB network may include relay nodes and anchor nodes connected via wireless backhaul links 134. For example, base stations 105 may be examples of IAB nodes, where the base stations 105 connected to the core network 130 via a wireline backhaul link 132 may be examples of donor or anchor nodes, and the base stations 105 not connected to the core network 130 with a wireline backhaul link 132 (e.g., and instead connected to other base stations 105 with wireless backhaul links 134) may be examples of relay nodes. A parent node of an IAB node may be used for timing synchronization. However, if the parent node is far away from a timing source, the IAB node may receive timing information from a non-parent, neighboring node.

For example, a first IAB node may determine its parent node is too far away from a timing source to provide reliable timing and synchronization message. The first IAB node may identify a second IAB node which is closer or connected to a timing source. The first IAB node may transmit a first random access message to the second IAB node. The second IAB node may transmit a second random access message to the first IAB node including timing and synchronization information. Generally, a random access message like the first random access message may be transmitted to initiate a handover procedure or a connection procedure. However, the first IAB node may have transmitted the first random access message to receive the timing information, not as part of a handover. Therefore, the first IAB node and second IAB node may determine that the first random access message was transmitted just for the timing and synchronization information and terminate the random access procedure.

In some cases, the first IAB node may transmit a connection termination request after receiving the timing information. In some cases, the network may indicate to the second IAB node that the first random access message was transmitted to receive the timing information and not to establish a connection. The second IAB node may then transmit a connection termination indication in the second random access message or in a later message to the first IAB node.

Figure 2:
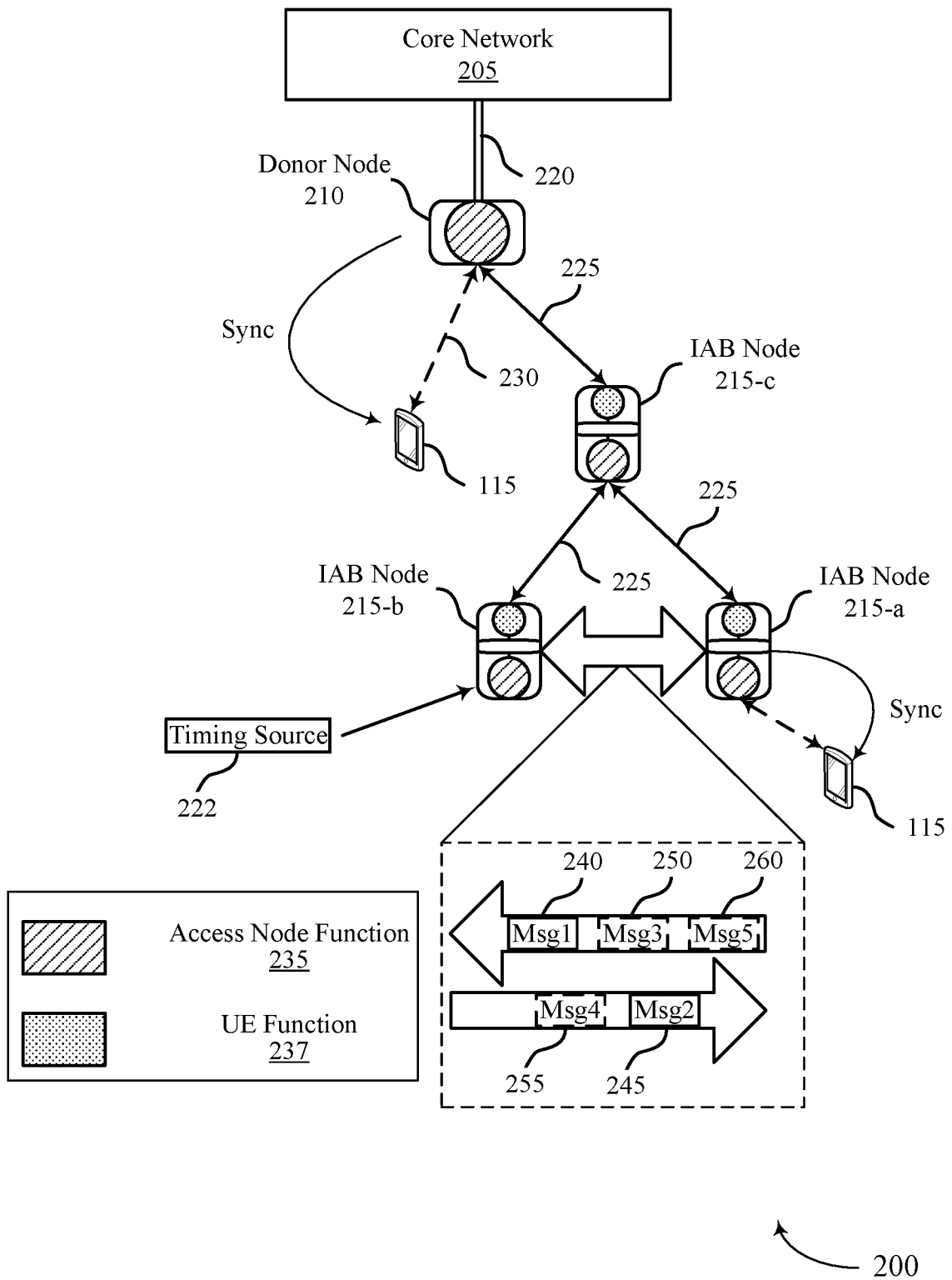
FIG. 2 illustrates an example of a wireless communications system that supports timing synchronization with neighbor nodes different from parent nodes in accordance with aspects of the present disclosure.

FIG. 2 illustrates an example of a wireless communications system 200 that supports timing synchronization with neighbor nodes different from parent nodes in accordance with aspects of the present disclosure. In some examples, wireless communications system 200 may implement aspects of wireless communications system 100.

Wireless communications system 200 (e.g., an NR system, a mmW system.) may supplement wireline backhaul connections (e.g., wireline backhaul links 220) by sharing infrastructure and spectral resources for network access with wireless backhaul link capabilities, providing an IAB network architecture. Wireless communications system 200 may include a core network 205 and base stations 105 or supported devices split into one or more support entities (i.e., functionalities) for promoting wireless backhaul density in collaboration with communication access. Aspects of the supporting functionalities of the base stations 105 may be referred to as IAB nodes, such as IAB donor nodes 210 and IAB nodes 215. In some cases, IAB nodes 215 (e.g., non-donor IAB nodes) may be referred to as IAB relay nodes. Wireless communications system 200 may additionally support a number of UEs 115, which may communicate on the uplink with one or more IAB donor nodes 210, IAB nodes 215, or a combination of these devices.

Wireless communications system 200 may include one or more IAB donor nodes 210, which may interface between a wireline network and a wireless network. In some cases, an IAB donor node 210 may be referred to as an anchor node, as the IAB donor node 210 anchors the wireless network to a wireline connection. For example, each IAB donor node 210 may include at least one wireline backhaul link 220 and one or more additional links (e.g., wireless backhaul links 225, backup wireless backhaul links, access links 230, etc.). An IAB donor node 210 may be split into associated base station centralized unit (CU) and distributed unit (DU) entities, where one or more DUs associated with an IAB donor node 210 may be partially controlled by an associated CU. CUs of IAB donor nodes 210 may host layer 3 (L3) (e.g., RRC, service data adaption protocol (SDAP), PDCP, etc.) functionality and signaling. Further, CUs of IAB donor nodes 210 may communicate with the core network 205 over a wireline backhaul link 220 (e.g., which may be referred to as an NG interface). DUs may host lower layer operations, such as layer 1 (L1) or layer 2 (L2) (e.g., RLC, MAC, PHY layer, etc.) functionality and signaling. A DU entity of an IAB donor node 210 may support a serving cell within the network coverage area according to connections associated with wireless backhaul links 225 and access links 230 of the IAB network. DUs of the IAB donor nodes 210 may control both access and backhaul links within the corresponding network coverage and may provide controlling and scheduling for descendant (i.e., child) IAB nodes 215 and or UEs 115. For example, a DU may support an RLC channel connection with a UE 115 (e.g., via an access link 230) or with an IAB node 215 (e.g., via a backhaul link, such as a primary wireless backhaul link 225 or a backup wireless backhaul link 225).

IAB nodes 215 may include an access node function (ANF) 235 and a UE function (UEF) 237. The ANF 235 (e.g., a gNB or gNB-DU with a MAC scheduler) may schedule the UEs and other IAB nodes under its control. The UEs 115 and other IAB nodes 215 under control of an IAB node 215 may be referred to as child nodes of the IAB node 215. The UEF 237 may act as a UE which is controlled and scheduled by the IAB donor node 210 or another IAB node 215. The donor or other IAB node 215 which controls and schedules the IAB node may be referred to as the parent node. The UEF functionality may be similar to functionality performed by UEs 115 in the system.

An IAB node 215 may not be directly connected to a wireline backhaul link 220. Instead, the IAB node 215 may connect to the core network 205 via other IAB nodes (e.g., any number of additional IAB nodes 215 and an IAB donor node 210) using wireless backhaul links. The IAB node 215 may transmit upstream (e.g., towards the core network 205) in the IAB system using ANF functionality. In some cases, UEFs of the IAB nodes 215 may be partially controlled by signaling messages from ANF or CU entities of an associated IAB donor node 210 (e.g., transmitted via an F1-application protocol (AP)). The UEFs 237 of the IAB relay nodes 215 may support serving cells of the network coverage area. For example, a UEF 237 of an IAB node 215 may perform the same or similar functions as a UEF 237 of an IAB donor node 210, supporting one or more access links 230 for UEs 115, one or more wireless backhaul links for downstream IAB relay nodes 215, or both.

The wireless communications system 200 may support over-the-air synchronization techniques. In a multi-hop IAB network with a hierarchical topology, an IAB node 215 may synchronize to its parent nodes by tracking downlink receive timing and adjusting its uplink transmit timing using provided timing information, such as a timing advance command (TAC). The parent node may have been selected based on the parent node providing the highest RSRP of candidate parent nodes or because that parent node provided the most load balanced configuration for the network. As such, a reliable timing source may not have been a factor when configuring a parent node for an IAB node. Therefore, the parent node may be multiple hops away from an actual timing source, and the parent node may not be a good source for timing information. The number of hops supported for receiving timing information from a parent node may be configurable. For example, if the parent node is more than a configured number of hops away from a timing source or the core network 205, then the timing information received from the parent node may not be considered reliable. In some cases, more than 5-7 hops may not be supported for receiving timing information from a parent node. In some other examples, even two or more hops may not be considered as providing reliable timing information.

In some cases, a non-parent neighbor node may be connected to a timing source 222 or a timing synchronization resource. The non-parent neighbor node may, then, be a better source of timing than the parent node. For example, IAB node 215-c may be the parent node of IAB node 215-a, but IAB node 215-c may be multiple hops away an actual timing source (e.g., the core network 205). However, IAB node 215-b may be connected directly, or be just a few hops away from, the timing source 222. Therefore, IAB node 215-a and IAB node 215-b may implement techniques for IAB node 215-b to provide updated timing information to IAB node 215-a.

The network (e.g., the core network 205 or a serving cell such as IAB node 215-c) may identify a list of nodes that can provide timing information to IAB node 215-a. The network may generate a synchronization signal block (SSB), a channel state information reference signal (CSI-RS) measurement window, or both, for IAB node 215-a. The network may then convey the SSB or CSI-RS measurement window via a serving cell (e.g., IAB node 215-c). In some cases, the network may ensure that IAB node 215-a does not receive data or control signaling from the serving node, IAB node 215-c, during the scheduled measurement windows.

The network may configure IAB node 215-a with a physical random access channel (PRACH) configuration including a list of other IAB nodes 215. IAB node 215-a may be able to transmit PRACH to the nodes in the list of nodes. IAB node 215-a may transmit PRACH to different nodes at different times. In some cases, the network may ensure that the nodes in the list of nodes do not receive data or control signaling from the serving cell during windows which may affect reception of the PRACH signaling from IAB node 215-a. For example, a serving cell may adjust scheduling of IAB nodes 215 such that the nodes in the list are not configured to receive data or control information during their respective windows for the PRACH signal.

As an example, IAB node 215-a may transmit a first message 240 (e.g., Msg1) to IAB node 215-b. IAB node 215-b may be in the list of nodes configured to receive PRACH from IAB node 215-a. The first message 240 may include a random access preamble (e.g., a random access channel (RACH) preamble). In some examples, the first message 240 may be an example of a first random access message or a first RACH message. In some cases, a RACH preamble may be transmitted as part of a random access procedure for a handover or as a means to connect to a cell. However, IAB node 215-a may instead transmit the first message 240 to receive timing information from IAB node 215-b. IAB node 215-a may not be transmitting the first message 240 to connect to IAB node 215-a. Therefore, IAB node 215-a may convey that the first message 240 is transmitted just to receive timing information and not to be handed over.

In response to the first message 240, IAB node 215-b may transmit a second message 245 (e.g., Msg2) to IAB node 215-a. The second message 245 may include updated timing information or synchronization information, such as a TAC. In some cases, IAB node 215-b may retrieve updated timing information from the timing source 222 based on receiving the first message 240. In some other examples, IAB node 215-b may transmit the second message 245 based on its most recent timing information. Therefore, IAB node 215-a may receive updated timing information from a node which is closer to a timing source 222 than its parent node (e.g., IAB node 215-c). In some cases, the second message 245 may be scrambled based on a random access radio network temporary identifier (RNTI). In some examples, the second message 245 may be an example of a second random access message or a second RACH message.

IAB node 215-a and IAB node 215-b may implement techniques for IAB node 215-a to receive the timing information from IAB node 215-b without being handed over to IAB node 215-b. In a first example, IAB node 215-a may inform IAB node 215-b that the random access procedure is terminated. In some cases, IAB node 215-a may transmit a request for terminating the connection or terminating the random access procedure. This may indicate or convey that IAB node 215-a does not want to be handed over to IAB node 215-b. Generally, IAB node 215-a may transmit a connection termination request after receiving a second message 245 from any node of the list of nodes configured to receive PRACH from IAB node 215-a.

In some cases of the first example, IAB node 215-a may transmit a third message 250 (e.g., Msg3) to IAB node 215-b. The third message 250 may include an indication of the termination of the random access procedure. Thus, IAB node 215-b may determine that IAB node 215-a is not requesting a handover based on receiving the third message 250. IAB node 215-b may terminate the random access procedure and handover accordingly. In some cases, the third message 250 may be an uplink transmission which is scheduled by a downlink control channel whose CRC bits are scrambled by a random access RNTI or a temporary cell RNTI. For example, IAB node 215-a may be scheduled to transmit the third message 250 by a downlink control channel message, and the CRC bits of the downlink control channel message which schedules the third message 250 may be scrambled by a random access RNTI or scrambled by a temporary cell RNTI. In some cases, the CRC bits of the third message 250 may be scrambled by the random access RNTI for an initial transmission and scrambled by the temporary cell RNTI for a retransmission of the third message 250. In some cases, an RRC connection request message may be an example of the third message 250.

In some cases of the first example, IAB node 215-a may transmit a fifth message 260 (e.g., Msg5) to IAB node 215-b, the fifth message 260 including a request for termination of the connection or random access procedure. In some cases, the fifth message 260 may be a first uplink transmission after receiving a fourth message 255 from IAB node 215-b. In some cases, an RRC connection setup complete message may be an example of the fifth message 260, which may be transmitted in response to an RRC connection setup message (e.g., an example of the fourth message 255).

In a second example, the network (e.g., including the core network 205 or the parent node, IAB node 215-c, or both) may inform the list of nodes about the first message 240 and that the PRACH is transmitted just to receive the timing information in the second message 245. In the second example, the RACH procedure or the connection procedure may stop after the second message 245, after the third message 250, after the fourth message 255, after the fifth message 260, or after a message which is transmitted after the fifth message 260. In some cases of the second example, the exchanges between the IAB nodes 215 may be coordinated by the network. For example, IAB node 215-b may determine, after receiving the first message 240, that IAB node 215-a is just requesting the timing information and is not requesting a handover. IAB node 215-b may transmit the timing information in the second message 245 and include an indication that the random access procedure or the connection procedure is terminated.

In some cases of the second example, IAB node 215-b may determine that the first message 240 is transmitted in order for IAB node 215-a to receive timing information, and not for a handover, upon receipt of the first message 240. For example, IAB node 215-a may include a preamble which indicates that the first message 240 is for the timing information and not a handover. In some cases, IAB node 215-b may be configured with a set of random access preambles, and upon detection of one of the random access preambles from the set, IAB node 215-b may determine that the message carrying that random access preamble was transmitted just to receive timing information and not for a handover. For example, the first message 240 may include one of the configured random access preambles, and IAB node 215-b may determine that IAB node 215-a is not requesting a handover. IAB node 215 may transmit the timing information in the second message 245, convey the termination of the random access procedure or connection procedure, and accordingly terminate the random access procedure or connection procedure. In some cases, the configured set of preambles may include one or more contention-free random access (CFRA) preambles. Or, in some cases, some dedicated contention-based random access preambles may be reserved and included in the configured set of random access preambles. If, for example, there are 64 possible preambles, a subset of those preambles (e.g., 8 out of the 64) may be reserved for this special type of the first message 240 which is transmitted just to receive timing information.

In some additional, or alternative, cases of the second example, IAB node 215-b may determine that IAB node 215-a is transmitting the first message just to receive the timing information before receiving the first message 240. For example, the parent node (e.g., IAB node 215-c) may indicate to IAB node 215-b that IAB node 215-a is performing the techniques to receive timing information from a non-parent neighbor cell as described herein. In some cases, the indication may be coordinated by the core network 205 and conveyed via the IAB node 215-c. In some cases, IAB node 215-a may use a random access preamble of a configured set as described herein when transmitting the first message 240. IAB node 215-b may determine that IAB node 215-a is not requesting a handover, then IAB node 215-b may receive the first message 240. IAB node 215 may transmit the timing information in the second message 245, convey the termination of the random access procedure or connection procedure, and accordingly terminate the random access procedure or connection procedure.

In some examples of the second example, IAB node 215-b may convey the termination of the random access procedure via one or more of a downlink control channel or downlink shared channel associated with the second message 245 (e.g., Msg2 physical downlink control channel (PDCCH) or Msg2 physical downlink shared channel (PDSCH)), a downlink control channel associated with the third message 250 (e.g., Msg3 PDCCH), or a downlink control channel or downlink shared channel associated with the fourth message 255 (e.g., Msg4 PDCCH or Msg4 PDSCH). In some cases, the second message downlink control channel and the second message downlink shared channel may be scrambled based on (e.g., with) a random access RNTI. In some cases, the third message downlink control channel may be scrambled based on (e.g., with) a temporary cell RNTI. In some examples, the fourth message downlink control channel and the fourth message downlink shared channel may be scrambled based on (e.g., with) a temporary cell RNTI or a cell RNTI.

Thus, after the described techniques, IAB node 215-a may have received timing information from IAB node 215-b without being handed over to another cell. Thus, IAB node 215-b may still be served by IAB node 215-c (e.g., IAB node 215-c is the parent node to IAB node 215-b). IAB node 215-a may implement the timing information, such as a TAC, to improve its synchronization within the IAB network.

Figure 3:
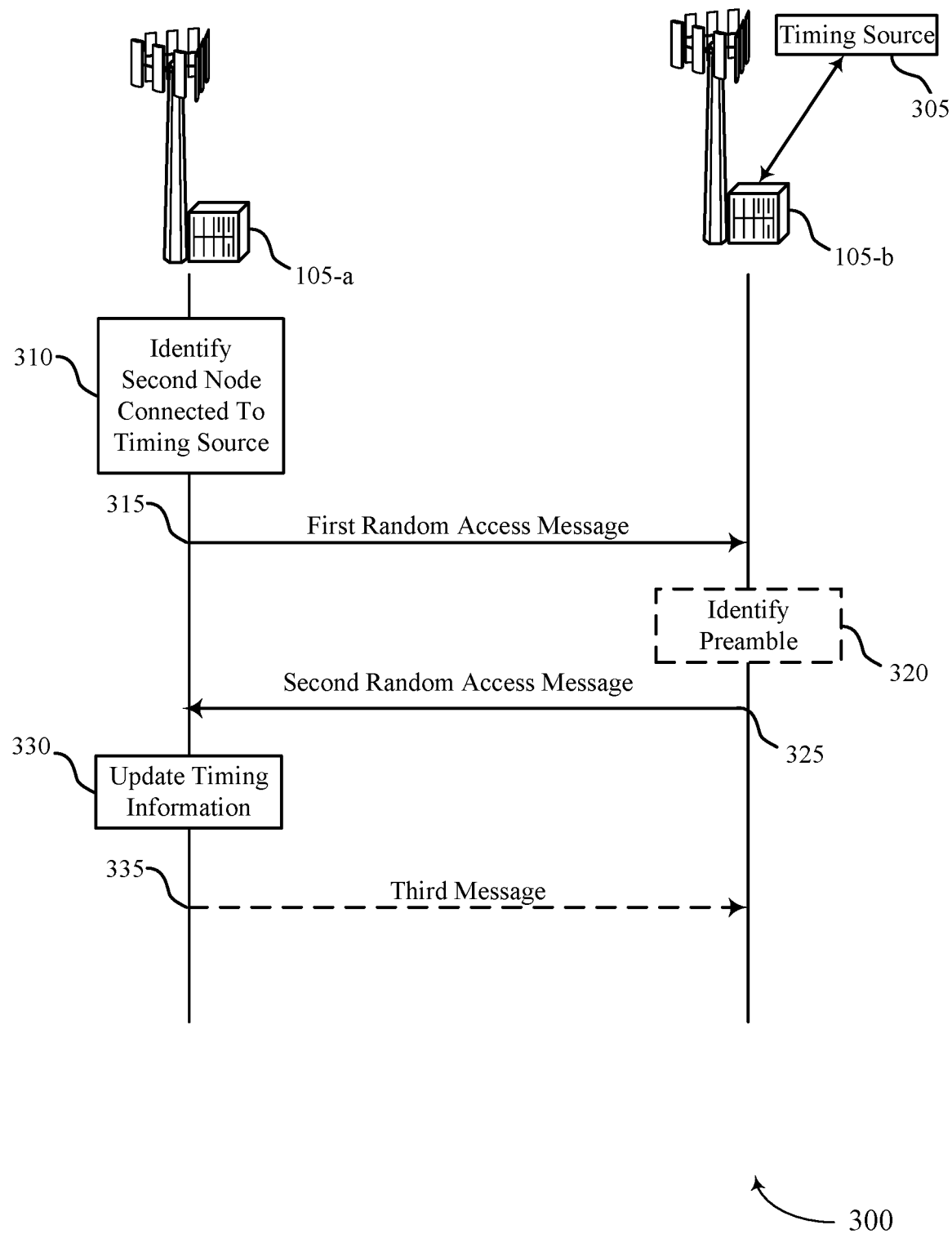
FIG. 3 illustrates an example of a process flow that supports timing synchronization with neighbor nodes different from parent nodes in accordance with aspects of the present disclosure.

FIG. 3 illustrates an example of a process flow 300 that supports timing synchronization with neighbor nodes different from parent nodes in accordance with aspects of the present disclosure. In some examples, process flow 300 may implement aspects of wireless communications system 100.

Process flow 300 may include two relay IAB nodes (e.g., base station 105-a and base station 105-b). These may be examples of the corresponding devices described with respect to FIGS. 1 through 3. Alternative examples of the following may be implemented, where some steps are performed in a different order than described or are not performed at all. In some cases, steps may include additional features not mentioned below, or further steps may be added.

Base station 105-a may be an example of an IAB node, and base station 105-b may be an example of a neighboring IAB node to base station 105-a. In some cases, base station 105-a and base station 105-b may share a common parent IAB node. Base station 105-b may be connected to a timing source 305. The timing source 305 may be a Global Positioning System (GPS) source or a Global Navigation Satellite System (GNSS) source, which can provide accurate timing information for synchronizing the IAB network.

The parent node of base station 105-a may be far away (e.g., based on number of hops) from a timing source such as the timing source 305. Therefore, the parent node of base station 105-a may not be a reliable source of timing information for base station 105-a to synchronize with the IAB network. Instead, base station 105-a may implement techniques to receive timing information from base station 105-b. As described herein, base station 105-a may be configured with a list of IAB nodes to which base station 105-a can transmit a random access message. Base station 105-b may be included in that list of IAB nodes. The network (e.g., the core network or the parent node of base station 105-b) may avoid scheduling base station 105-b during a scheduled window for base station 105-*a* to transmit the random access message.

At 310, base station 105-*a* may identify a second node of the wireless communications system (e.g., base station 105-*b*), where the second node is associated with the timing source 305.

At 315, base station 105-*a* may transmit a first random access message to base station 105-*b* to initiate a random access procedure. The first random access message may include, for example, a RACH preamble. The first random access message may be an example of the Msg1 described herein. In some cases, base station 105-*a* may include a preamble from a pre-configured set of preambles which indicate that the first random access message is transmitted just to receive timing information, and that the first random access message is not transmitted for a handover or connection procedure.

Base station 105-*b* may receive the first random access message and determine timing information to transmit to base station 105-*a*. In some cases, at 320, base station 105-*a* may have included a special or a pre-configured random access preamble in the first random access message. Base station 105-*b* may identify a preamble of the first random access message that is associated with termination of the random access procedure. Thus, base station 105-*b* may determine that the first random access message was not transmitted for a handover or connection procedure and was instead transmitted for base station 105-*a* to receive updated timing information.

At 325, base station 105-*b* may transmit a second random access message to base station 105-*a*, the second random access message including the timing information from the timing source 305. In some examples, base station 105-*b* may include an indication of the random access termination in the second random access message. For example, if base station 105-*a* includes a preamble which indicates the random access procedure termination, base station 105-*b* may include a random access procedure termination indication in the second random access message. One or more of the nodes may then terminate the random access procedure accordingly.

At 330, base station 105-*a* may update its timing or synchronization configuration based on the timing information included in the second random access message. For example, the timing information may include a TAC, and base station 105-*a* may update its timing advance configuration.

In some cases, at 335, base station 105-*a* may transmit a third message to base station 105-*b*, the third message including a request for termination of the random access procedure. For example, base station 105-*a* may transmit the third message to convey that the first random access message was transmitted in order to receive timing and synchronization information and not for a handover or connection procedure. In some cases, the random access procedure may be terminated based on base station 105-*a* transmitting the third message including the random access procedure termination request.

Additionally, or alternatively, other messages may be transmitted to convey the request for terminating the random access procedure. For example, base station 105-*a* may transmit a message (e.g., Msg5) after the third message which conveys the request for terminating the random access procedure. In some cases, base station 105-*b* may transmit the random access procedure termination indication in a downlink control channel associated with the third message, a downlink control channel of a fourth message (e.g., Msg4), or a downlink shared channel of the fourth message. In some examples, the downlink control channel and the downlink shared channel of the second random access message (e.g., Msg2 PDCCH and Msg2 PDSCH) may be scrambled with a random access RNTI. In some cases, the third message may be scheduled by a downlink control channel whose CRC bits are scrambled by a random access RNTI or a temporary cell RNTI. The fourth message (e.g., Msg4 PDCCH or Msg4 PDSCH) may be scrambled with a temporary cell RNTI or a cell RNTI.

Figure 4:
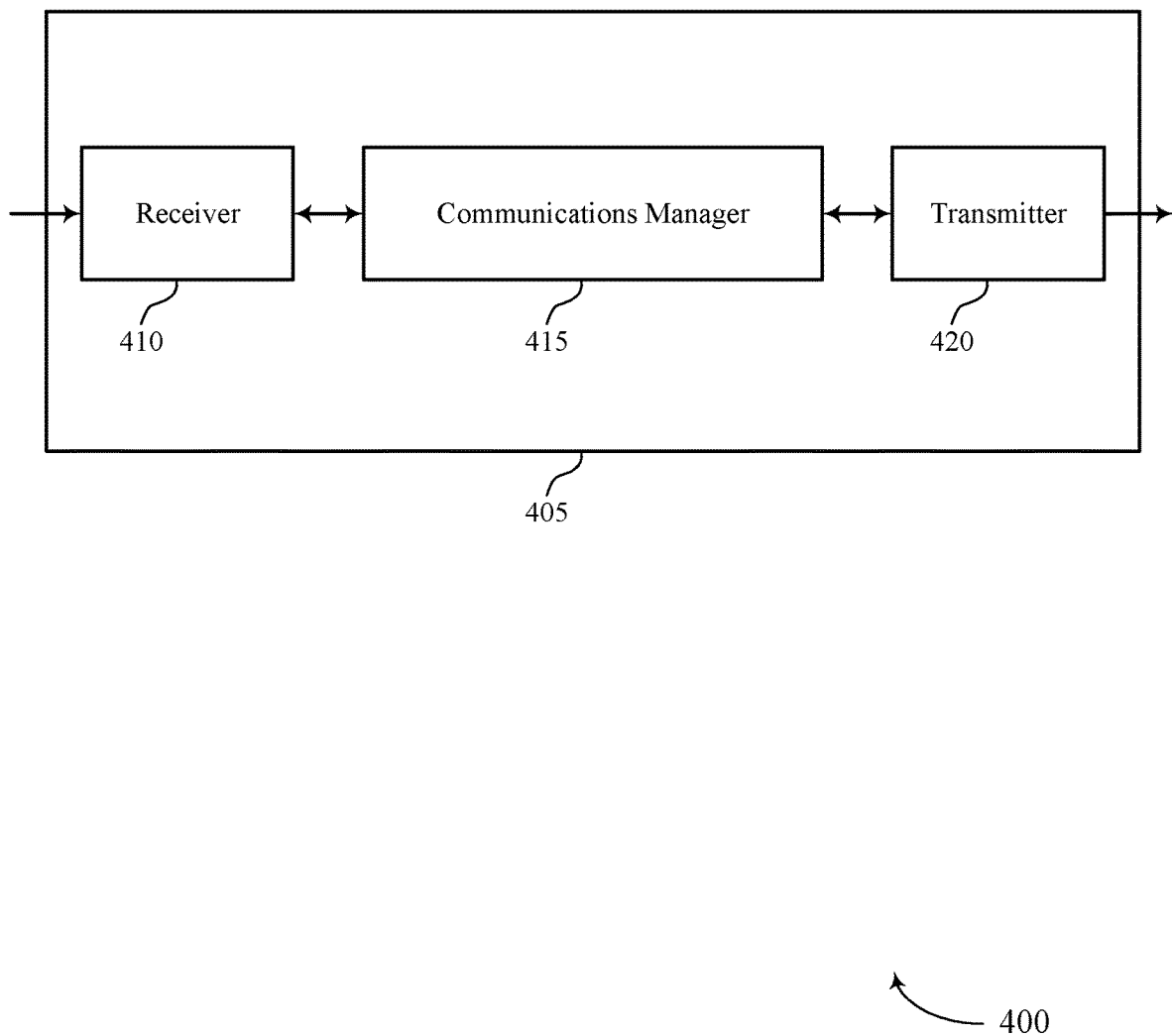
FIGS. 4 and 5 show block diagrams of devices that support timing synchronization with neighbor nodes different from parent nodes in accordance with aspects of the present disclosure.

FIG. 4 shows a block diagram 400 of a device 405 that supports timing synchronization with neighbor nodes different from parent nodes in accordance with aspects of the present disclosure. The device 405 may be an example of aspects of a base station 105 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to timing synchronization with neighbor nodes different from parent nodes, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may identify, at a first node of a wireless communications system, a second node of the wireless communications system, where the second node is a neighbor of the first node and is different from a parent node of the first node, the second node is associated with a timing source, transmit a first random access message to the second node to initiate a random access procedure, receive a second random access message from the second node, the second random access message including timing information based on the timing source, and terminate the random access procedure based on receiving the second random access message.

The communications manager 415 may also identify, at a second node of a wireless communications system associated with a timing source, a first node of the wireless communications system, where the second node is a neighbor of the first node and the second node is different from a parent node of the first node, receive a first random access message initiating a random access procedure from the first node, retrieve timing information from the timing source based on the first random access message and the random access procedure, transmit a second random access message to the first node, the second random access message including the timing information from the timing source, and terminate the random access procedure based on transmitting the second random access message including the timing information. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
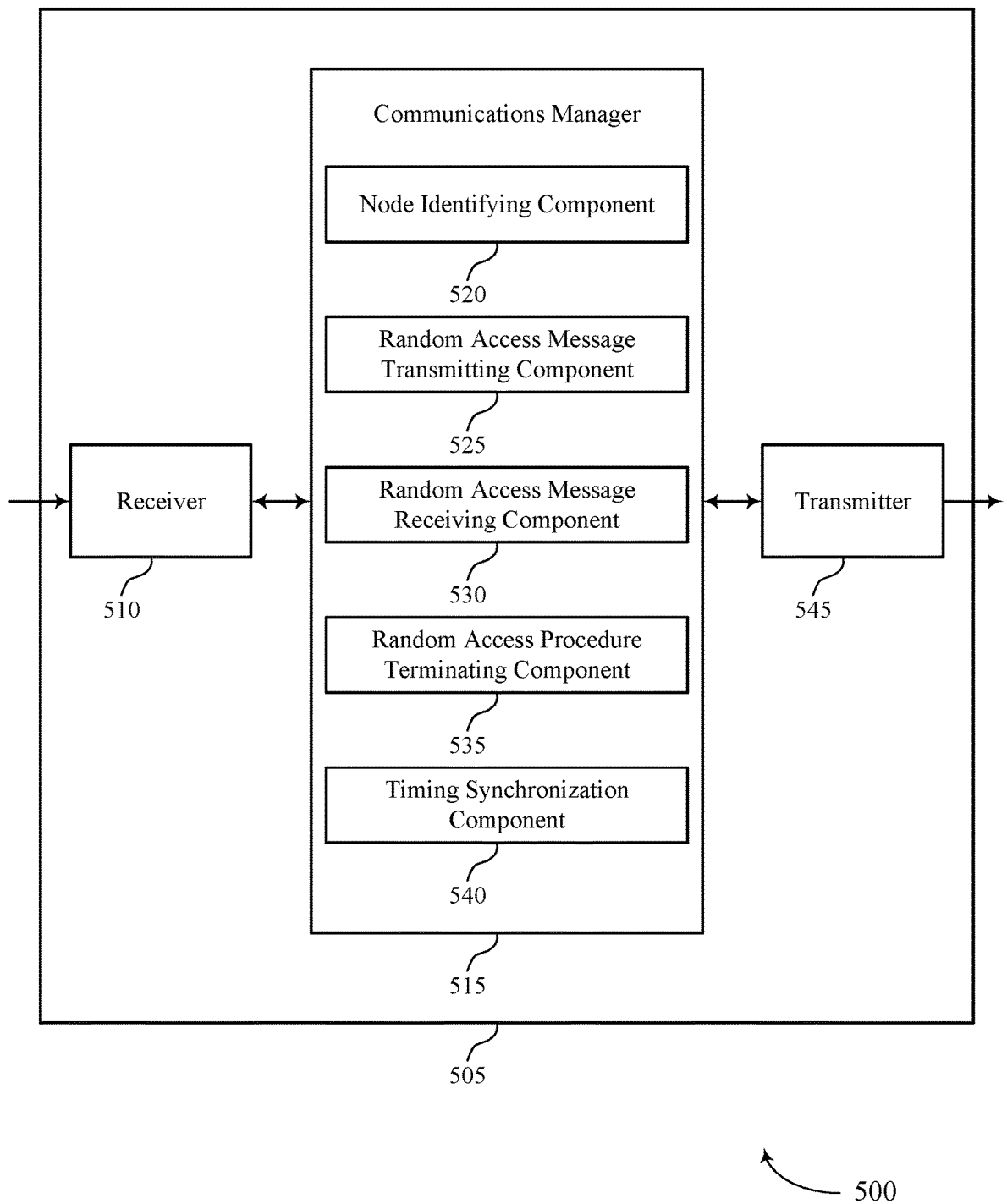

FIG. 5 shows a block diagram 500 of a device 505 that supports timing synchronization with neighbor nodes different from parent nodes in accordance with aspects of the present disclosure. The device 505 may be an example of aspects of a device 405, or a base station 105 as described herein. The device 505 may include a receiver 510, a communications manager 515, and a transmitter 545. The device 505 may also include a processor. Each of these components may be in communication with one another (e.g., via one or more buses).

The receiver 510 may receive information such as packets, user data, or control information associated with various information channels (e.g., control channels, data channels, and information related to timing synchronization with neighbor nodes different from parent nodes, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a node identifying component 520, a random access message transmitting component 525, a random access message receiving component 530, a random access procedure terminating component 535, and a timing synchronization component 540. The communications manager 515 may be an example of aspects of the communications manager 710 described herein.

The node identifying component 520 may identify, at a first node of a wireless communications system, a second node of the wireless communications system, where the second node is a neighbor of the first node and is different from a parent node of the first node, the second node is associated with a timing source. The random access message transmitting component 525 may transmit a first random access message to the second node to initiate a random access procedure. The random access message receiving component 530 may receive a second random access message from the second node, the second random access message including timing information based on the timing source. The random access procedure terminating component 535 may terminate the random access procedure based on receiving the second random access message.

The node identifying component 520 may identify, at a second node of a wireless communications system associated with a timing source, a first node of the wireless communications system, where the second node is a neighbor of the first node and the second node is different from a parent node of the first node. The random access message receiving component 530 may receive a first random access message initiating a random access procedure from the first node. The timing synchronization component 540 may retrieve timing information from the timing source based on the first random access message and the random access procedure. The random access message transmitting component 525 may transmit a second random access message to the first node, the second random access message including the timing information from the timing source. The random access procedure terminating component 535 may terminate the random access procedure based on transmitting the second random access message including the timing information.

The transmitter 545 may transmit signals generated by other components of the device 505. In some examples, the transmitter 545 may be collocated with a receiver 510 in a transceiver module. For example, the transmitter 545 may be an example of aspects of the transceiver 720 described with reference to FIG. 7. The transmitter 545 may utilize a single antenna or a set of antennas.

Figure 6:
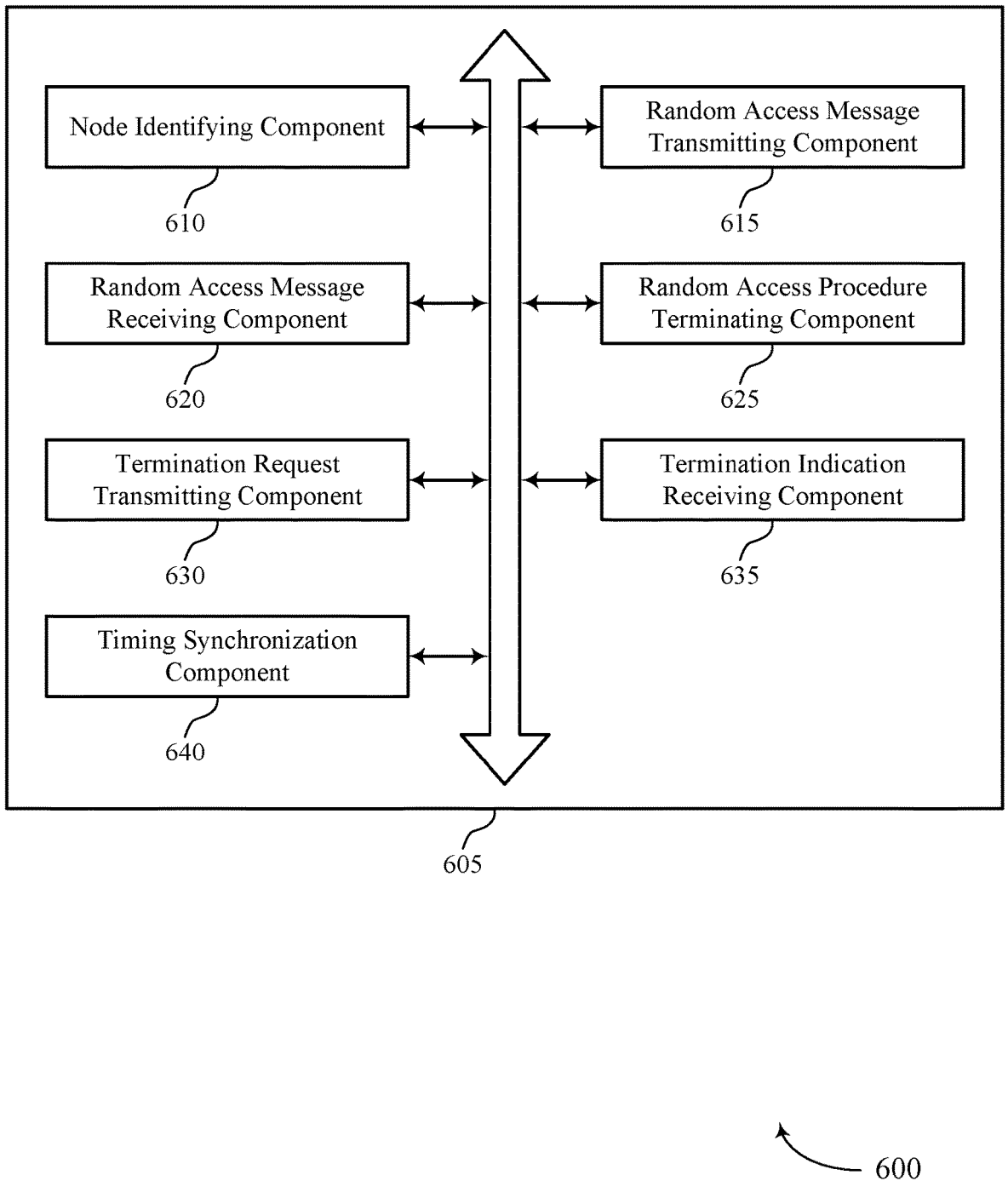
FIG. 6 shows a block diagram of a communications manager that supports timing synchronization with neighbor nodes different from parent nodes in accordance with aspects of the present disclosure.

FIG. 6 shows a block diagram 600 of a communications manager 605 that supports timing synchronization with neighbor nodes different from parent nodes in accordance with aspects of the present disclosure. The communications manager 605 may be an example of aspects of a communications manager 415, a communications manager 515, or a communications manager 710 described herein. The communications manager 605 may include a node identifying component 610, a random access message transmitting component 615, a random access message receiving component 620, a random access procedure terminating component 625, a termination request transmitting component 630, a termination indication receiving component 635, and a timing synchronization component 640. Each of these modules may communicate, directly or indirectly, with one another (e.g., via one or more buses).

The node identifying component 610 may identify, at a first node of a wireless communications system, a second node of the wireless communications system, where the second node is a neighbor of the first node and is different from a parent node of the first node, the second node is associated with a timing source. The random access message transmitting component 615 may transmit a first random access message to the second node to initiate a random access procedure. In some examples, the random access message transmitting component 615 may transmit the first random access message with a preamble that is associated with the termination of the random access procedure.

The random access message receiving component 620 may receive a second random access message from the second node, the second random access message including timing information based on the timing source. In some examples, the random access message receiving component 620 may CRC bits of the second random access message are scrambled by an RNTI. The random access procedure terminating component 625 may terminate the random access procedure based on receiving the second random access message.

The termination request transmitting component 630 may transmit a third message to the second node, where the third message includes a request for the termination of the random access procedure. In some cases, the third message includes one or more of a RRC connection request message or a RRC connection setup complete message. In some examples, the termination request transmitting component 630 may receive a control channel message scheduling the third message, where CRC bits of the control channel message are scrambled by a random access RNTI or a temporary cell RNTI.

In some examples, the termination request transmitting component 630 may receive a RRC connection setup message from the second node. In some examples, the termination request transmitting component 630 may transmit an uplink message after receiving the RRC connection setup message, where the uplink message includes a request for the termination of the random access procedure.

The termination indication receiving component 635 may receive an indication of the termination of the random access procedure from the second node, where the indication is received via one or more of a downlink control channel associated with the second random access message, a downlink shared channel associated with the second random access message, a downlink control channel associated with a third message, a downlink control channel associated with a fourth message, or a downlink shared channel associated with the fourth message.

In some cases, the downlink control channel associated with the second random access message and the downlink shared channel associated with the second random access message are scheduled with a random access RNTI, the downlink control channel of the third message is scheduled with a temporary cell RNTI, or the downlink control channel of the fourth message and the downlink shared channel of the fourth message are scheduled with the random access RNTI or the temporary cell RNTI.

In some examples, the timing synchronization component 640 may receive, from a parent node, a list of nodes associated with a timing synchronization process, where the list of nodes includes the second node, and transmitting the first random access message is based on the list of nodes. In some examples, the timing synchronization component 640 may convey to the second node that the first random access message was transmitted to receive the timing information and not for a handover.

In some examples, the timing synchronization component 640 may determine a timing advance command based on the timing information included in the second random access message. In some cases, the timing source connected to the second node is a GNSS source.

In some examples, the node identifying component 610 may identify, at a second node of a wireless communications system associated with a timing source, a first node of the wireless communications system, where the second node is a neighbor of the first node and the second node is different from a parent node of the first node. In some examples, the random access message transmitting component 615 may transmit a second random access message to the first node, the second random access message including the timing information from the timing source.

In some examples, the random access message receiving component 620 may receive a first random access message initiating a random access procedure from the first node. In some examples, the random access message receiving component 620 may identify a preamble of the first random access message that is associated with the termination of the random access procedure.

In some examples, the random access message receiving component 620 may terminate the random access procedure includes receiving a third message from the first node, where the third message includes a request for the termination of the random access procedure. In some examples, the random access message receiving component 620 may transmit a control channel message scheduling the third message, where CRC bits of the control channel message are scrambled by a random access RNTI or a temporary cell RNTI.

In some cases, the third message includes one or more of a RRC connection request message or a RRC connection setup complete message. In some examples, the random access procedure terminating component 625 may terminate the random access procedure based on transmitting the second random access message including the timing information.

In some examples, the random access procedure terminating component 625 may transmit a RRC connection setup message to the first node. In some examples, terminating the random access procedure may include receiving an uplink message from the first node after transmitting the RRC connection setup message, where the uplink message includes a request for the termination of the random access procedure.

In some examples, the random access procedure terminating component 625 may transmit an indication of the termination of the random access procedure to the first node, where the indication is transmitted via one or more of a downlink control channel associated with the second random access message, a downlink shared channel associated with the second random access message, a downlink control channel associated with a third message, a downlink control channel associated with a fourth message, or a downlink shared channel associated with the fourth message.

In some cases, the downlink control channel associated with the second random access message and the downlink shared channel associated with the second random access message are scheduled with an RNTI, the downlink control channel of the third message is scheduled with a temporary cell RNTI, or the downlink control channel of the fourth message and the downlink shared channel of the fourth message are scheduled with the random access RNTI or the temporary cell RNTI.

The timing synchronization component 640 may retrieve timing information from the timing source based on the first random access message and the random access procedure. In some examples, the timing synchronization component 640 may scramble CRC bits of the second random access message with a random access RNTI. In some examples, the timing synchronization component 640 may indicate a timing advance command based on the timing information included in the second random access message.

In some examples, the timing synchronization component 640 may receive an indication from the first node that the first random access message was transmitted to receive the timing information and not for a handover. In some cases, the timing source connected to the second node is a GNSS source.

Figure 7:
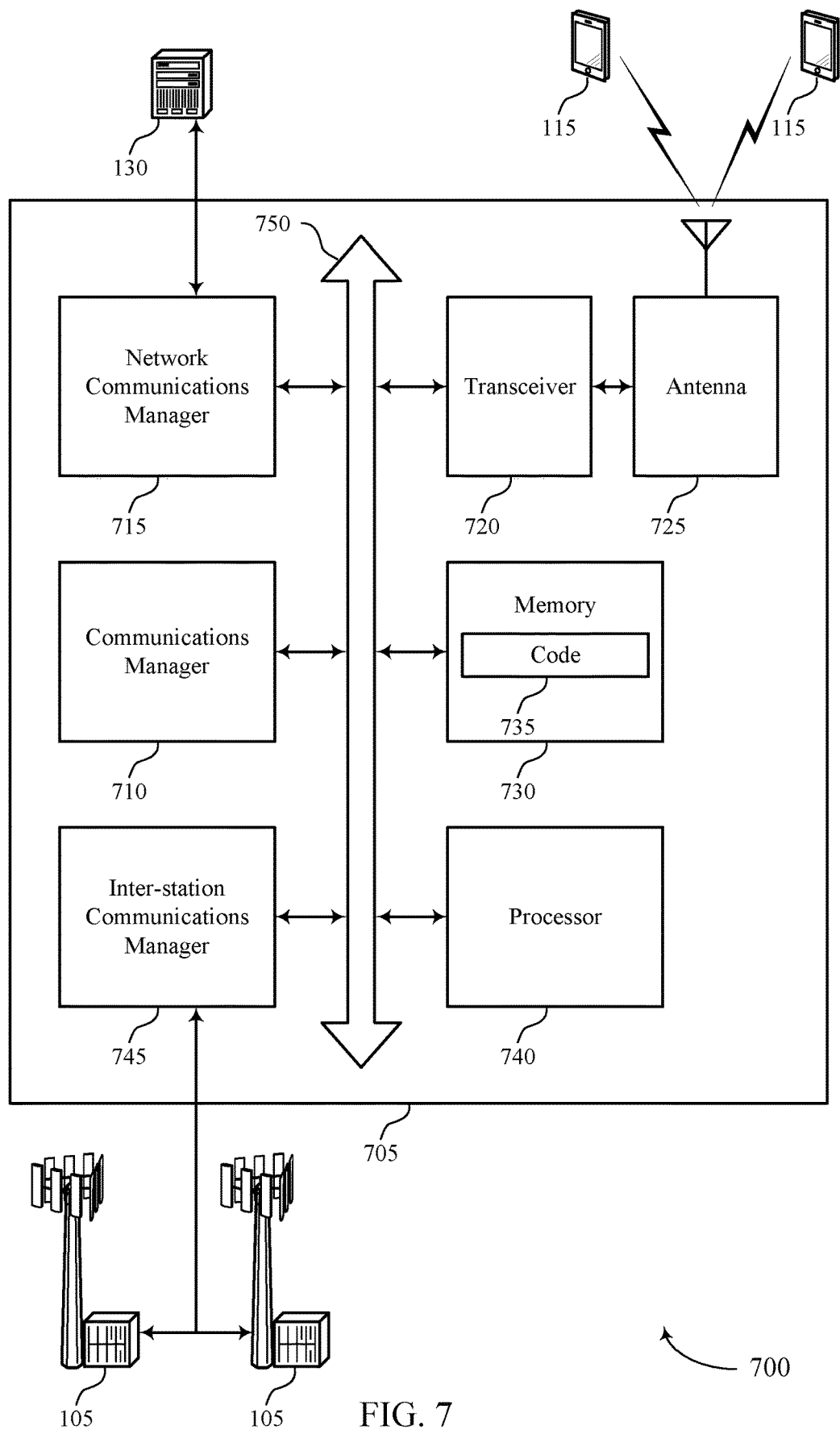
FIG. 7 shows a diagram of a system including a device that supports timing synchronization with neighbor nodes different from parent nodes in accordance with aspects of the present disclosure.

FIG. 7 shows a diagram of a system 700 including a device 705 that supports timing synchronization with neighbor nodes different from parent nodes in accordance with aspects of the present disclosure. The device 705 may be an example of or include the components of device 405, device 505, or a base station 105 as described herein. The device 705 may include components for bi-directional voice and data communications including components for transmitting and receiving communications, including a communications manager 710, a network communications manager 715, a transceiver 720, an antenna 725, memory 730, a processor 740, and an inter-station communications manager 745. These components may be in electronic communication via one or more buses (e.g., bus 750).

The communications manager 710 may identify, at a first node of a wireless communications system, a second node of the wireless communications system, where the second node is a neighbor of the first node and is different from a parent node of the first node, the second node is associated with a timing source, transmit a first random access message to the second node to initiate a random access procedure, receive a second random access message from the second node, the second random access message including timing information based on the timing source, and terminate the random access procedure based on receiving the second random access message.

The communications manager 710 may also identify, at a second node of a wireless communications system associated with a timing source, a first node of the wireless communications system, where the second node is a neighbor of the first node and the second node is different from a parent node of the first node, receive a first random access message initiating a random access procedure from the first node, retrieve timing information from the timing source based on the first random access message and the random access procedure, transmit a second random access message to the first node, the second random access message including the timing information from the timing source, and terminate the random access procedure based on transmitting the second random access message including the timing information.

The network communications manager 715 may manage communications with the core network (e.g., via one or more wired backhaul links). For example, the network communications manager 715 may manage the transfer of data communications for client devices, such as one or more UEs 115.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM), read only memory (ROM), or a combination thereof. The memory 730 may store computer-readable code 735 including instructions that, when executed by a processor (e.g., the processor 740) cause the device to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In some cases, a memory controller may be integrated into processor 740. The processor 740 may be configured to execute computer-readable instructions stored in a memory (e.g., the memory 730) to cause the device 705 to perform various functions (e.g., functions or tasks supporting timing synchronization with neighbor nodes different from parent nodes).

The inter-station communications manager 745 may manage communications with other base station 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communication network technology to provide communication between base stations 105.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
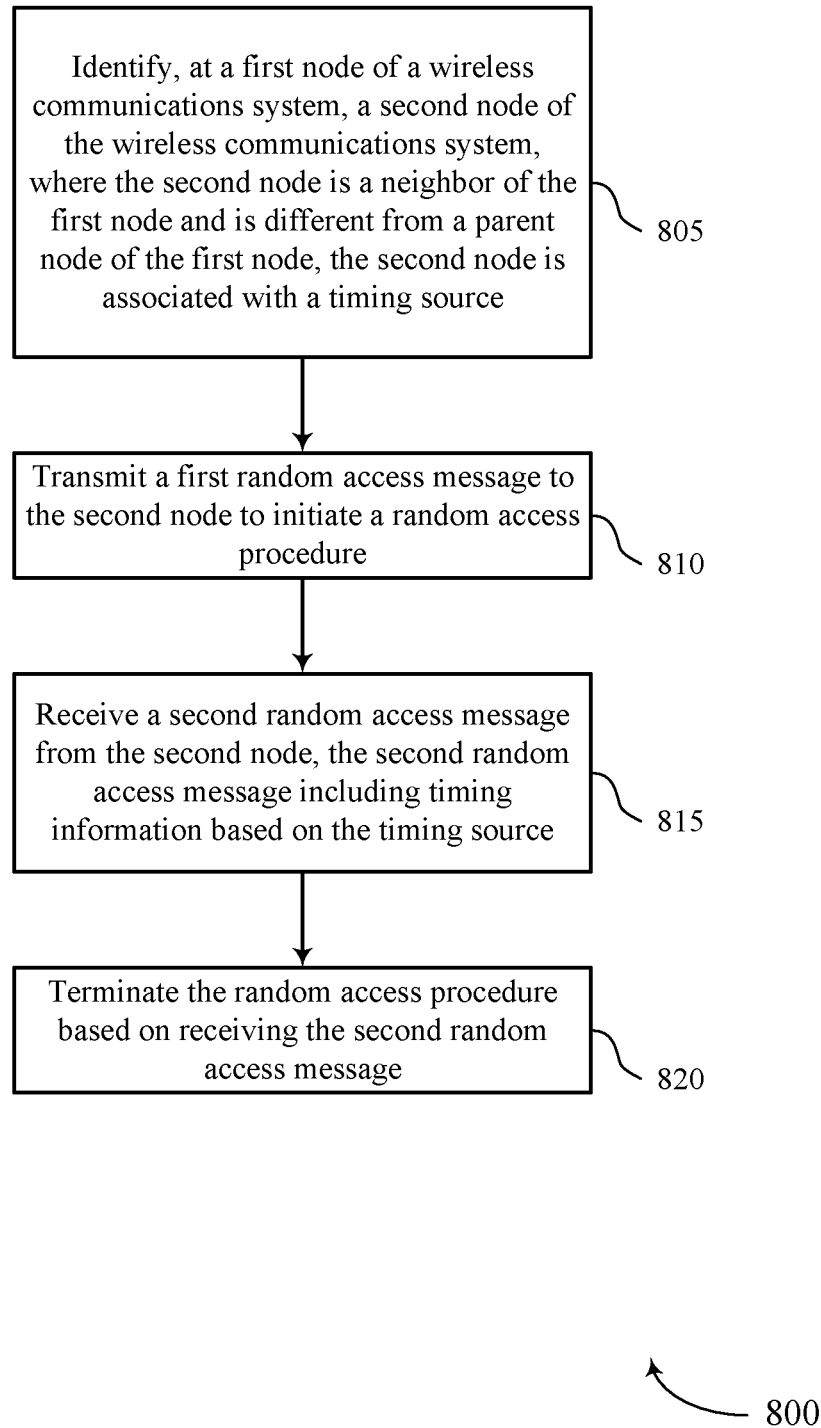
FIGS. 8 through 13 show flowcharts illustrating methods that support timing synchronization with neighbor nodes different from parent nodes in accordance with aspects of the present disclosure.

FIG. 8 shows a flowchart illustrating a method 800 that supports timing synchronization with neighbor nodes different from parent nodes in accordance with aspects of the present disclosure. The operations of method 800 may be implemented by a base station 105 or its components as described herein. For example, the operations of method 800 may be performed by a communications manager as described with reference to FIGS. 4 through 7. In some examples, a base station may execute a set of instructions to control the functional elements of the base station to perform the functions described herein. Additionally or alternatively, a base station may perform aspects of the functions described herein using special-purpose hardware.

At 805, the base station may identify, at a first node of a wireless communications system, a second node of the wireless communications system, where the second node is a neighbor of the first node and is different from a parent node of the first node, the second node is associated with a timing source. The operations of 805 may be performed according to the methods described herein. In some examples, aspects of the operations of 805 may be performed by a node identifying component as described with reference to FIGS. 4 through 7.

At 810, the base station may transmit a first random access message to the second node to initiate a random access procedure. The operations of 810 may be performed according to the methods described herein. In some examples, aspects of the operations of 810 may be performed by a random access message transmitting component as described with reference to FIGS. 4 through 7.

At 815, the base station may receive a second random access message from the second node, the second random access message including timing information based on the timing source. The operations of 815 may be performed according to the methods described herein. In some examples, aspects of the operations of 815 may be performed by a random access message receiving component as described with reference to FIGS. 4 through 7.

At 820, the base station may terminate the random access procedure based on receiving the second random access message. The operations of 820 may be performed according to the methods described herein. In some examples, aspects of the operations of 820 may be performed by a random access procedure terminating component as described with reference to FIGS. 4 through 7.

Figure 9:
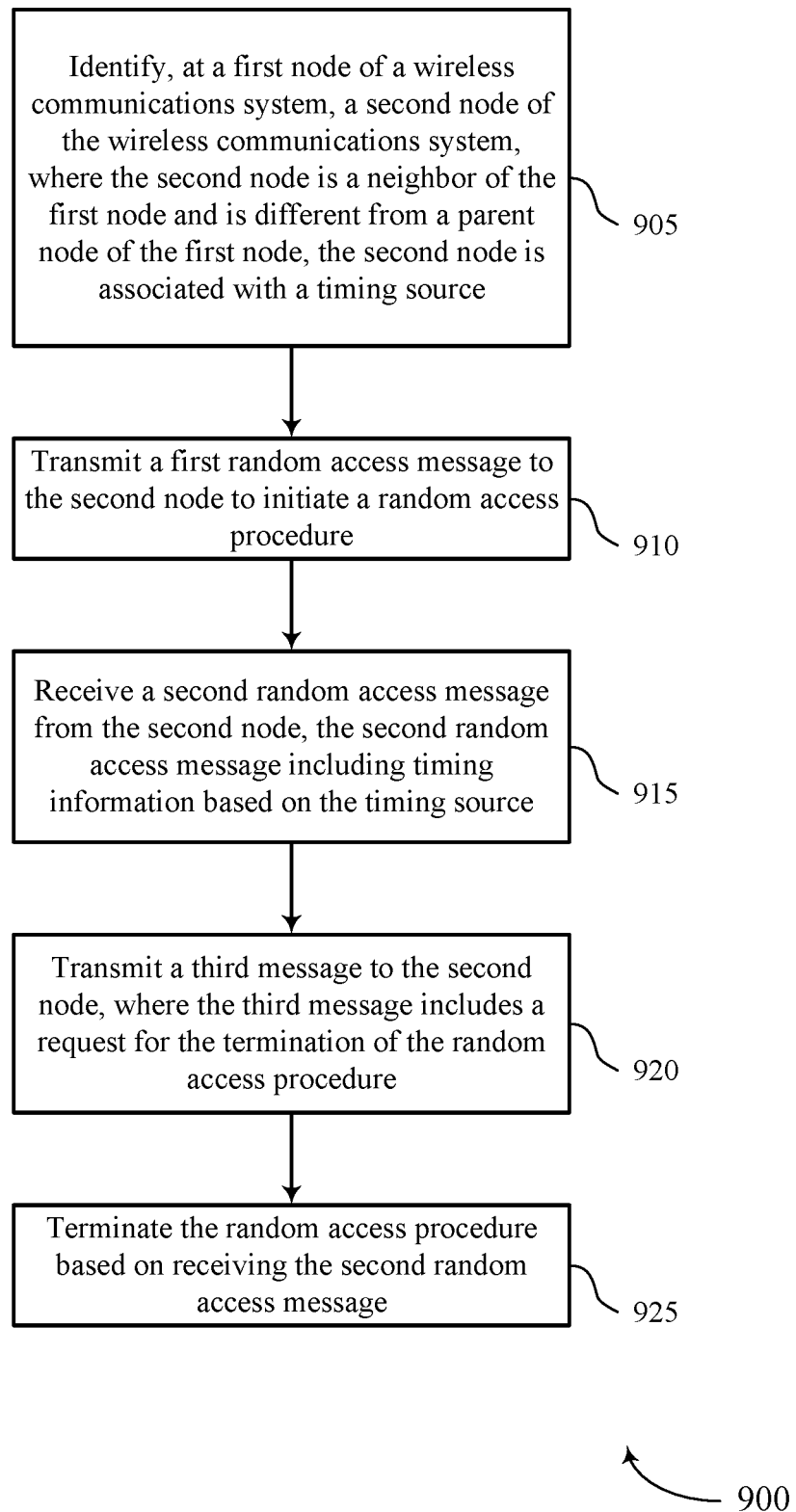

FIG. 9 shows a flowchart illustrating a method 900 that supports timing synchronization with neighbor nodes different from parent nodes in accordance with aspects of the present disclosure. The operations of method 900 may be implemented by a base station 105 or its components as described herein. For example, the operations of method 900 may be performed by a communications manager as described with reference to FIGS. 4 through 7. In some examples, a base station may execute a set of instructions to control the functional elements of the base station to perform the functions described herein. Additionally or alternatively, a base station may perform aspects of the functions described herein using special-purpose hardware.

At 905, the base station may identify, at a first node of a wireless communications system, a second node of the wireless communications system, where the second node is a neighbor of the first node and is different from a parent node of the first node, the second node is associated with a timing source. The operations of 905 may be performed according to the methods described herein. In some examples, aspects of the operations of 905 may be performed by a node identifying component as described with reference to FIGS. 4 through 7.

At 910, the base station may transmit a first random access message to the second node to initiate a random access procedure. The operations of 910 may be performed according to the methods described herein. In some examples, aspects of the operations of 910 may be performed by a random access message transmitting component as described with reference to FIGS. 4 through 7.

At 915, the base station may receive a second random access message from the second node, the second random access message including timing information based on the timing source. The operations of 915 may be performed according to the methods described herein. In some examples, aspects of the operations of 915 may be performed by a random access message receiving component as described with reference to FIGS. 4 through 7.

At 920, the base station may transmit a third message to the second node, where the third message includes a request for the termination of the random access procedure. The operations of 920 may be performed according to the methods described herein. In some examples, aspects of the operations of 920 may be performed by a termination request transmitting component as described with reference to FIGS. 4 through 7.

At 925, the base station may terminate the random access procedure based on receiving the second random access message. The operations of 925 may be performed according to the methods described herein. In some examples, aspects of the operations of 925 may be performed by a random access procedure terminating component as described with reference to FIGS. 4 through 7.

Figure 10:
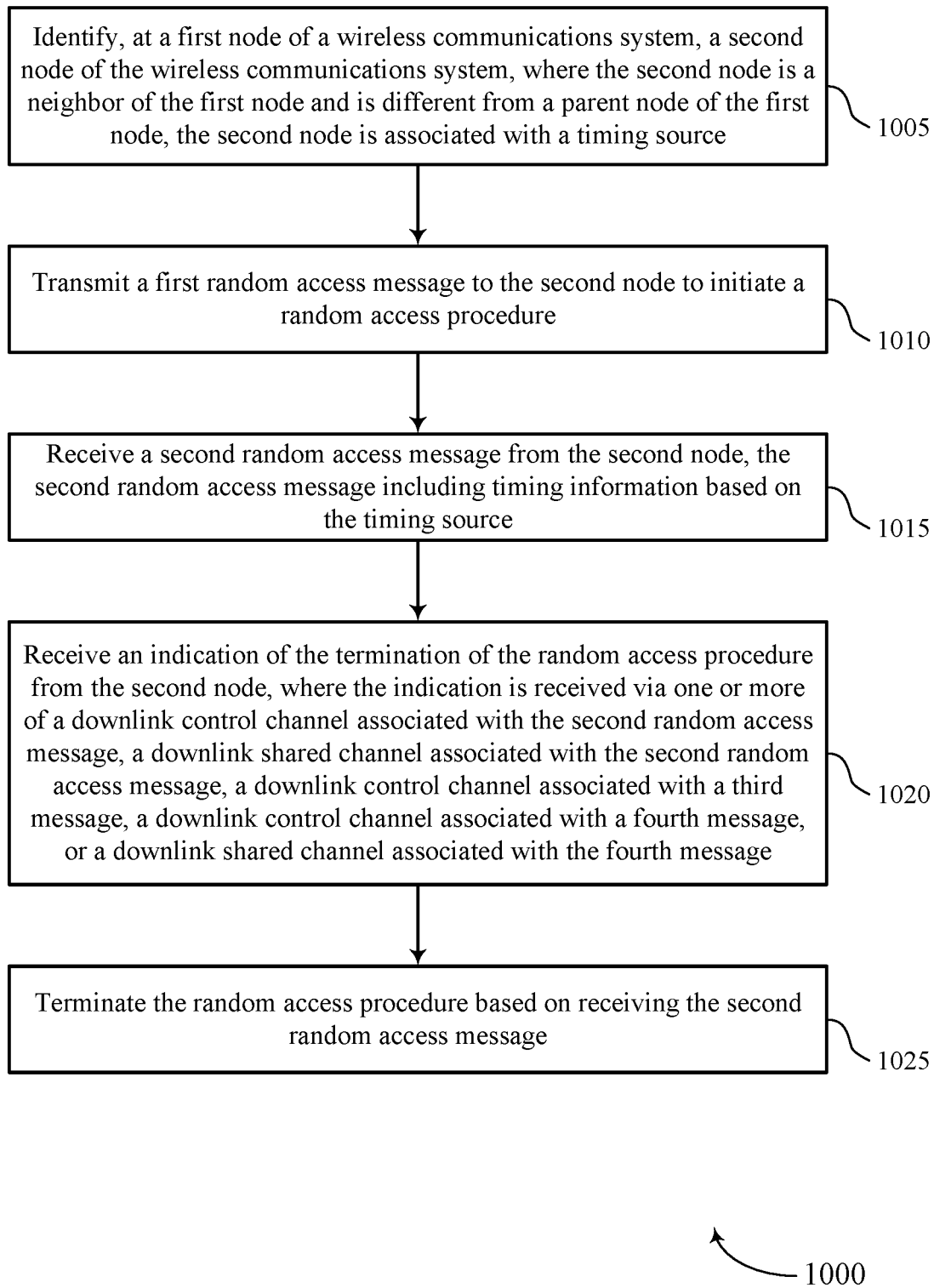

FIG. 10 shows a flowchart illustrating a method 1000 that supports timing synchronization with neighbor nodes different from parent nodes in accordance with aspects of the present disclosure. The operations of method 1000 may be implemented by a base station 105 or its components as described herein. For example, the operations of method 1000 may be performed by a communications manager as described with reference to FIGS. 4 through 7. In some examples, a base station may execute a set of instructions to control the functional elements of the base station to perform the functions described herein. Additionally or alternatively, a base station may perform aspects of the functions described herein using special-purpose hardware.

At 1005, the base station may identify, at a first node of a wireless communications system, a second node of the wireless communications system, where the second node is a neighbor of the first node and is different from a parent node of the first node, the second node is associated with a timing source. The operations of 1005 may be performed according to the methods described herein. In some examples, aspects of the operations of 1005 may be performed by a node identifying component as described with reference to FIGS. 4 through 7.

At 1010, the base station may transmit a first random access message to the second node to initiate a random access procedure. The operations of 1010 may be performed according to the methods described herein. In some examples, aspects of the operations of 1010 may be performed by a random access message transmitting component as described with reference to FIGS. 4 through 7.

At 1015, the base station may receive a second random access message from the second node, the second random access message including timing information based on the timing source. The operations of 1015 may be performed according to the methods described herein. In some examples, aspects of the operations of 1015 may be performed by a random access message receiving component as described with reference to FIGS. 4 through 7.

At 1020, the base station may receive an indication of the termination of the random access procedure from the second node, where the indication is received via one or more of a downlink control channel associated with the second random access message, a downlink shared channel associated with the second random access message, a downlink control channel associated with a third message, a downlink control channel associated with a fourth message, or a downlink shared channel associated with the fourth message. The operations of 1020 may be performed according to the methods described herein. In some examples, aspects of the operations of 1020 may be performed by a termination indication receiving component as described with reference to FIGS. 4 through 7.

At 1025, the base station may terminate the random access procedure based on receiving the second random access message. The operations of 1025 may be performed according to the methods described herein. In some examples, aspects of the operations of 1025 may be performed by a random access procedure terminating component as described with reference to FIGS. 4 through 7.

Figure 11:
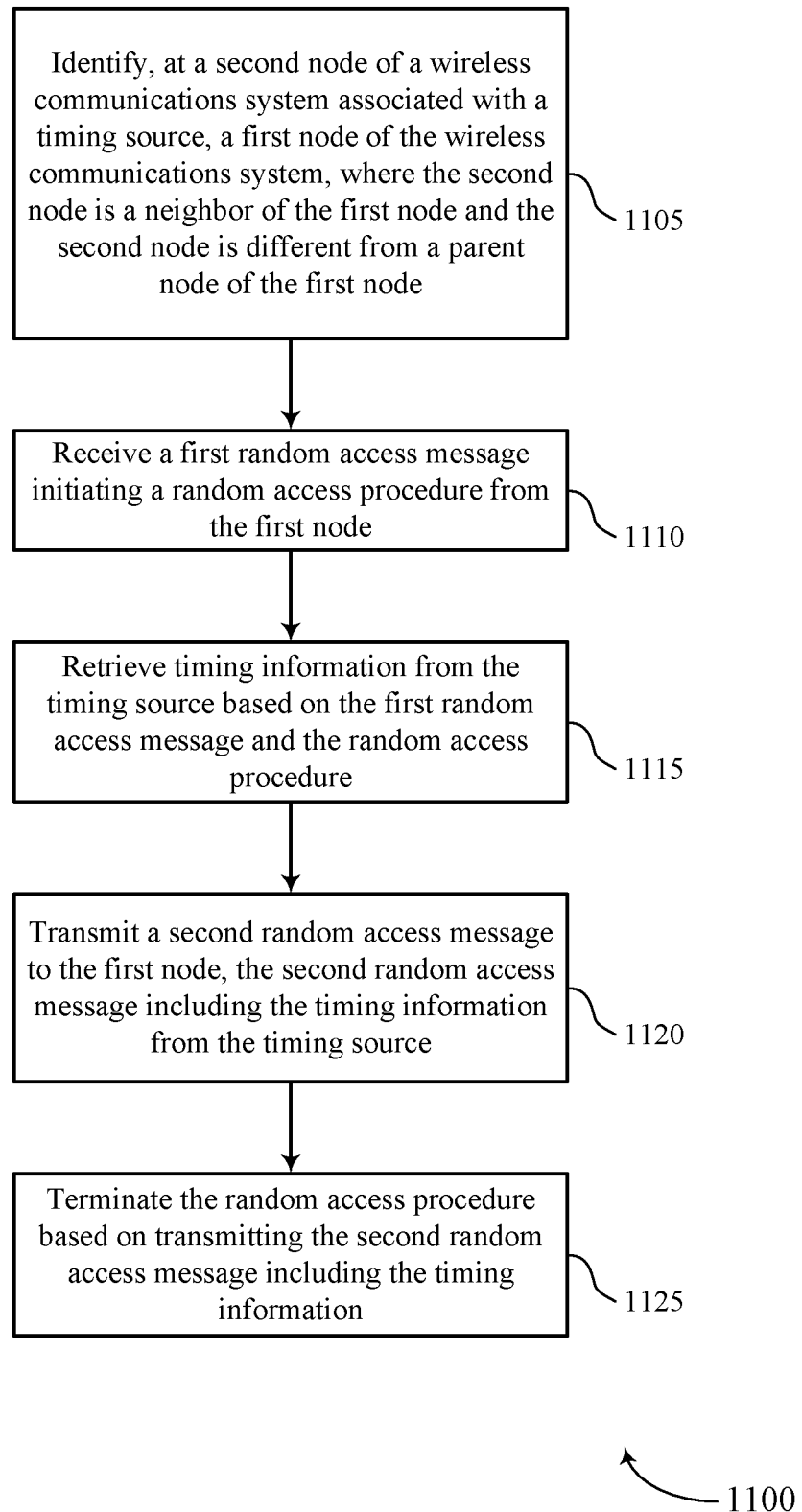

FIG. 11 shows a flowchart illustrating a method 1100 that supports timing synchronization with neighbor nodes different from parent nodes in accordance with aspects of the present disclosure. The operations of method 1100 may be implemented by a base station 105 or its components as described herein. For example, the operations of method 1100 may be performed by a communications manager as described with reference to FIGS. 4 through 7. In some examples, a base station may execute a set of instructions to control the functional elements of the base station to perform the functions described herein. Additionally or alternatively, a base station may perform aspects of the functions described herein using special-purpose hardware.

At 1105, the base station may identify, at a second node of a wireless communications system associated with a timing source, a first node of the wireless communications system, where the second node is a neighbor of the first node and the second node is different from a parent node of the first node. The operations of 1105 may be performed according to the methods described herein. In some examples, aspects of the operations of 1105 may be performed by a node identifying component as described with reference to FIGS. 4 through 7.

At 1110, the base station may receive a first random access message initiating a random access procedure from the first node. The operations of 1110 may be performed according to the methods described herein. In some examples, aspects of the operations of 1110 may be performed by a random access message receiving component as described with reference to FIGS. 4 through 7.

At 1115, the base station may retrieve timing information from the timing source based on the first random access message and the random access procedure. The operations of 1115 may be performed according to the methods described herein. In some examples, aspects of the operations of 1115 may be performed by a timing synchronization component as described with reference to FIGS. 4 through 7.

At 1120, the base station may transmit a second random access message to the first node, the second random access message including the timing information from the timing source. The operations of 1120 may be performed according to the methods described herein. In some examples, aspects of the operations of 1120 may be performed by a random access message transmitting component as described with reference to FIGS. 4 through 7.

At 1125, the base station may terminate the random access procedure based on transmitting the second random access message including the timing information. The operations of 1125 may be performed according to the methods described herein. In some examples, aspects of the operations of 1125 may be performed by a random access procedure terminating component as described with reference to FIGS. 4 through 7.

Figure 12:
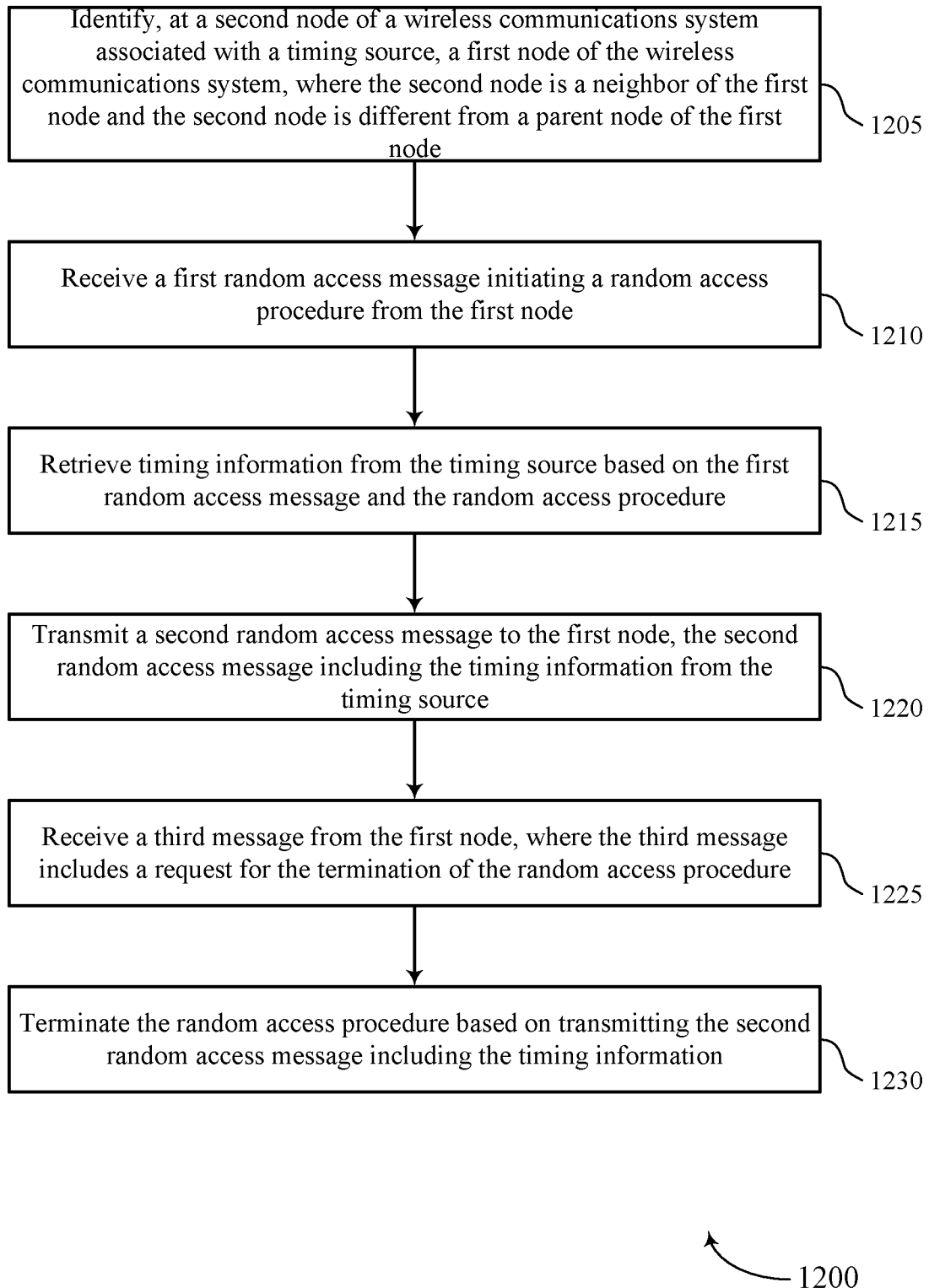

FIG. 12 shows a flowchart illustrating a method 1200 that supports timing synchronization with neighbor nodes different from parent nodes in accordance with aspects of the present disclosure. The operations of method 1200 may be implemented by a base station 105 or its components as described herein. For example, the operations of method 1200 may be performed by a communications manager as described with reference to FIGS. 4 through 7. In some examples, a base station may execute a set of instructions to control the functional elements of the base station to perform the functions described herein. Additionally or alternatively, a base station may perform aspects of the functions described herein using special-purpose hardware.

At 1205, the base station may identify, at a second node of a wireless communications system associated with a timing source, a first node of the wireless communications system, where the second node is a neighbor of the first node and the second node is different from a parent node of the first node. The operations of 1205 may be performed according to the methods described herein. In some examples, aspects of the operations of 1205 may be performed by a node identifying component as described with reference to FIGS. 4 through 7.

At 1210, the base station may receive a first random access message initiating a random access procedure from the first node. The operations of 1210 may be performed according to the methods described herein. In some examples, aspects of the operations of 1210 may be performed by a random access message receiving component as described with reference to FIGS. 4 through 7.

At 1215, the base station may retrieve timing information from the timing source based on the first random access message and the random access procedure. The operations of 1215 may be performed according to the methods described herein. In some examples, aspects of the operations of 1215 may be performed by a timing synchronization component as described with reference to FIGS. 4 through 7.

At 1220, the base station may transmit a second random access message to the first node, the second random access message including the timing information from the timing source. The operations of 1220 may be performed according to the methods described herein. In some examples, aspects of the operations of 1220 may be performed by a random access message transmitting component as described with reference to FIGS. 4 through 7.

At 1225, the base station may receive a third message from the first node, where the third message includes a request for the termination of the random access procedure. The operations of 1225 may be performed according to the methods described herein. In some examples, aspects of the operations of 1225 may be performed by a random access message receiving component as described with reference to FIGS. 4 through 7.

At 1230, the base station may terminate the random access procedure based on transmitting the second random access message including the timing information. The operations of 1230 may be performed according to the methods described herein. In some examples, aspects of the operations of 1230 may be performed by a random access procedure terminating component as described with reference to FIGS. 4 through 7.

Figure 13:
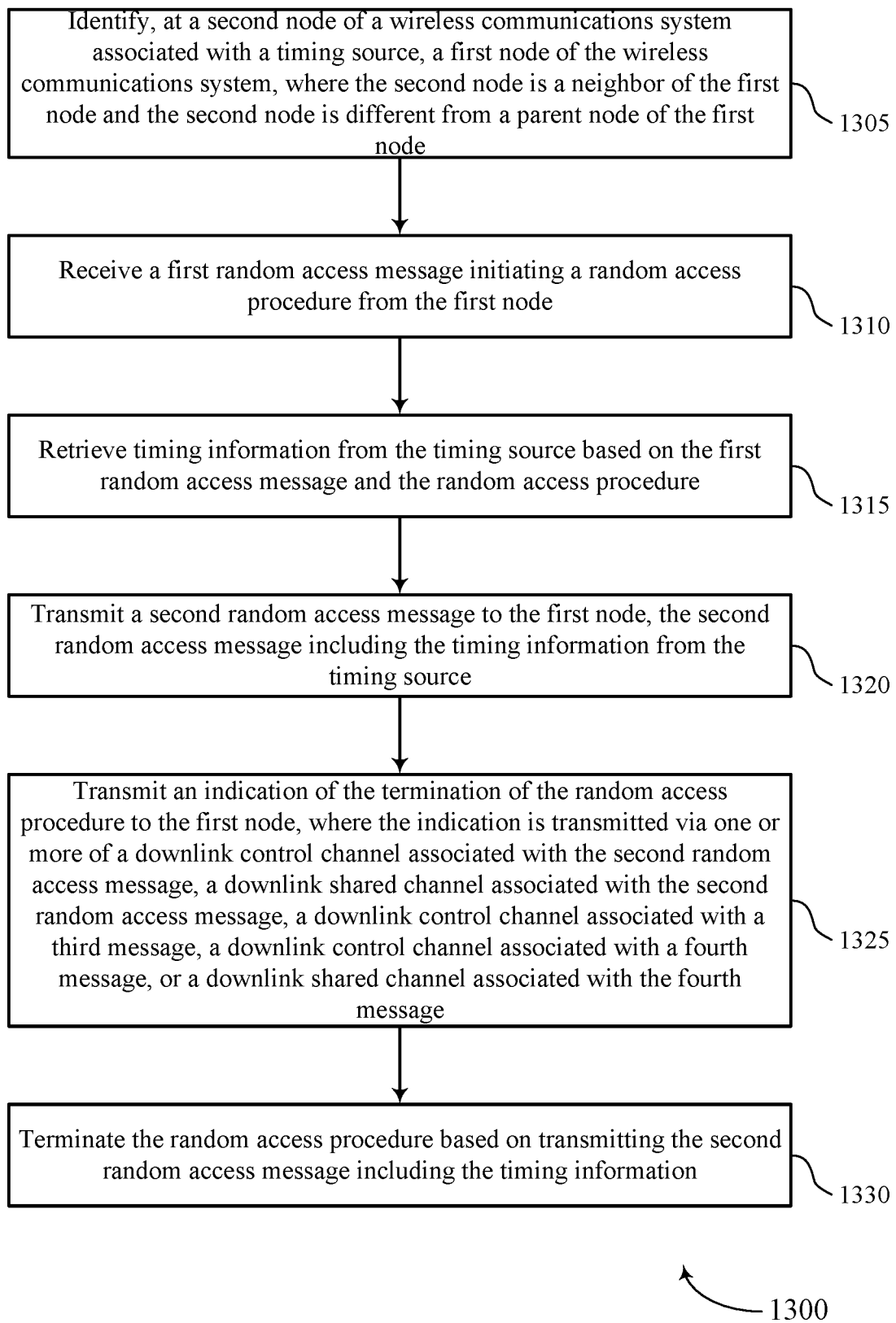

FIG. 13 shows a flowchart illustrating a method 1300 that supports timing synchronization with neighbor nodes different from parent nodes in accordance with aspects of the present disclosure. The operations of method 1300 may be implemented by a base station 105 or its components as described herein. For example, the operations of method 1300 may be performed by a communications manager as described with reference to FIGS. 4 through 7. In some examples, a base station may execute a set of instructions to control the functional elements of the base station to perform the functions described herein. Additionally or alternatively, a base station may perform aspects of the functions described herein using special-purpose hardware.

At 1305, the base station may identify, at a second node of a wireless communications system associated with a timing source, a first node of the wireless communications system, where the second node is a neighbor of the first node and the second node is different from a parent node of the first node. The operations of 1305 may be performed according to the methods described herein. In some examples, aspects of the operations of 1305 may be performed by a node identifying component as described with reference to FIGS. 4 through 7.

At 1310, the base station may receive a first random access message initiating a random access procedure from the first node. The operations of 1310 may be performed according to the methods described herein. In some examples, aspects of the operations of 1310 may be performed by a random access message receiving component as described with reference to FIGS. 4 through 7.

At 1315, the base station may retrieve timing information from the timing source based on the first random access message and the random access procedure. The operations of 1315 may be performed according to the methods described herein. In some examples, aspects of the operations of 1315 may be performed by a timing synchronization component as described with reference to FIGS. 4 through 7.

At 1320, the base station may transmit a second random access message to the first node, the second random access message including the timing information from the timing source. The operations of 1320 may be performed according to the methods described herein. In some examples, aspects of the operations of 1320 may be performed by a random access message transmitting component as described with reference to FIGS. 4 through 7.

At 1325, the base station may transmit an indication of the termination of the random access procedure to the first node, where the indication is transmitted via one or more of a downlink control channel associated with the second random access message, a downlink shared channel associated with the second random access message, a downlink control channel associated with a third message, a downlink control channel associated with a fourth message, or a downlink shared channel associated with the fourth message. The operations of 1325 may be performed according to the methods described herein. In some examples, aspects of the operations of 1325 may be performed by a random access procedure terminating component as described with reference to FIGS. 4 through 7.

At 1330, the base station may terminate the random access procedure based on transmitting the second random access message including the timing information. The operations of 1330 may be performed according to the methods described herein. In some examples, aspects of the operations of 1330 may be performed by a random access procedure terminating component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
transmitting, at a first node of a wireless communications system, a first random access message to a second node to initiate a random access procedure based at least in part on the second node being associated with a timing source, wherein the second node is a neighbor of the first node and is different from a parent node of the first node;
receiving a second random access message from the second node, the second random access message comprising timing information based at least in part on the timing source; and
terminating the random access procedure prior to establishing a connection with the second node via the random access procedure based at least in part on receiving the second random access message.

2. The method of claim 1, wherein terminating the random access procedure further comprises:
transmitting a third message to the second node, wherein the third message comprises a request for the termination of the random access procedure.

3. The method of claim 2, further comprising:
receiving a control channel message scheduling the third message, wherein cyclic redundancy check (CRC) bits of the control channel message are scrambled by a random access radio network temporary identifier (RNTI) or a temporary cell RNTI.

4. The method of claim 2, wherein the third message comprises one or more of a radio resource control connection request message or a radio resource control connection setup complete message.

5. The method of claim 1, wherein terminating the random access procedure further comprises:
receiving a radio resource control connection setup message from the second node; and
transmitting an uplink message after receiving the radio resource control connection setup message, wherein the uplink message comprises a request for the termination of the random access procedure.

6. The method of claim 1, wherein transmitting the first random access message further comprises:
transmitting the first random access message with a preamble that is associated with the termination of the random access procedure.

7. The method of claim 1, further comprising:
receiving an indication of the termination of the random access procedure from the second node, wherein the indication is received via one or more of a downlink control channel associated with the second random access message, a downlink shared channel associated with the second random access message, a downlink control channel associated with a third message, a downlink control channel associated with a fourth message, or a downlink shared channel associated with the fourth message.

8. The method of claim 7, wherein the downlink control channel associated with the second random access message and the downlink shared channel associated with the second random access message are scheduled with a random access radio network temporary identifier (RNTI), the downlink control channel of the third message is scheduled with a temporary cell RNTI, or the downlink control channel of the fourth message and the downlink shared channel of the fourth message are scheduled with the random access RNTI or the temporary cell RNTI.

9. The method of claim 1, wherein cyclic redundancy check (CRC) bits of the second random access message are scrambled by a random access radio network temporary identifier (RNTI).

10. The method of claim 1, further comprising:
determining a timing advance command based at least in part on the timing information included in the second random access message.

11. The method of claim 1, further comprising:
receiving, from the parent node, a list of nodes associated with a timing synchronization process, wherein the list of nodes comprises the second node, and transmitting the first random access message is based at least in part on the list of nodes.

12. The method of claim 1, further comprising:
transmitting an indication to the second node that the first random access message was transmitted to receive the timing information, wherein the random access procedure is terminated based at least in part on transmitting the indication.

13. The method of claim 1, wherein the timing source connected to the second node is a Global Navigation Satellite System (GNSS) source.

14. A method for wireless communication, comprising:
receiving, at a second node of a wireless communications system, a first random access message initiating a random access procedure from a first node based at least in part on the second node being associated with a timing source, wherein the second node is a neighbor of the first node and is different from a parent node of the first node;
retrieving timing information from the timing source based at least in part on the first random access message and the random access procedure;
transmitting a second random access message to the first node, the second random access message comprising the timing information from the timing source; and
terminating the random access procedure prior to establishing a connection with the first node via the random access procedure based at least in part on transmitting the second random access message comprising the timing information.

15. The method of claim 14, wherein terminating the random access procedure further comprises:
receiving a third message from the first node, wherein the third message comprises a request for the termination of the random access procedure.

16. The method of claim 15, further comprising:
transmitting a control channel message scheduling the third message, wherein cyclic redundancy check (CRC) bits of the control channel message are scrambled by a random access radio network temporary identifier (RNTI) or a temporary cell RNTI.

17. The method of claim 15, wherein the third message comprises one or more of a radio resource control connection request message or a radio resource control connection setup complete message.

18. The method of claim 14, wherein terminating the random access procedure further comprises:
transmitting a radio resource control connection setup message to the first node; and
receiving an uplink message from the first node after transmitting the radio resource control connection setup message, wherein the uplink message comprises a request for the termination of the random access procedure.

19. The method of claim 14, wherein receiving the first random access message further comprises:
identifying a preamble of the first random access message that is associated with the termination of the random access procedure.

20. The method of claim 14, further comprising:
transmitting an indication of the termination of the random access procedure to the first node, wherein the indication is transmitted via one or more of a downlink control channel associated with the second random access message, a downlink shared channel associated with the second random access message, a downlink control channel associated with a third message, a downlink control channel associated with a fourth message, or a downlink shared channel associated with the fourth message.

21. The method of claim 20, wherein the downlink control channel associated with the second random access message and the downlink shared channel associated with the second random access message are scheduled with a random access radio network temporary identifier (RNTI), the downlink control channel of the third message is scheduled with a temporary cell RNTI, or the downlink control channel of the fourth message and the downlink shared channel of the fourth message are scheduled with the random access RNTI or the temporary cell RNTI.

22. The method of claim 14, further comprising:
scrambling cyclic redundancy check (CRC) bits of the second random access message with a random access radio network temporary identifier (RNTI).

23. The method of claim 14, further comprising:
indicating a timing advance command based at least in part on the timing information included in the second random access message.

24. The method of claim 14, further comprising:
receiving an indication from the first node that the first random access message was transmitted to receive the timing information, wherein the random access procedure is terminated based at least in part on transmitting the indication.

25. The method of claim 14, wherein the timing source connected to the second node is a Global Navigation Satellite System (GNSS) source.

26. An apparatus for wireless communication, comprising: a processor, memory coupled with the processor; and instructions stored in the memory and executable by the processor to cause the apparatus to:

transmit, from a first node of a wireless communications system, a first random access message to a second node to initiate a random access procedure based at least in part on the second node being associated with a timing source, wherein the second node is a neighbor of the first node and is different from a parent node of the first node;

receive a second random access message from the second node, the second random access message comprising timing information based at least in part on the timing source; and terminate the random access procedure prior to establishing a connection with the second node via the random access procedure based at least in part on receiving the second random access message.

27. The apparatus of claim 26, wherein the instructions to terminate the random access procedure are further executable by the processor to cause the apparatus to:

transmit a third message to the second node, wherein the third message comprises a request for the termination of the random access procedure.

28. The apparatus of claim 27, wherein the instructions are further executable by the processor to cause the apparatus to:

receive a control channel message scheduling the third message, wherein cyclic redundancy check (CRC) bits of the control channel message are scrambled by a random access radio network temporary identifier (RNTI) or a temporary cell RNTI.

29. An apparatus for wireless communication, comprising: a processor, memory coupled with the processor; and instructions stored in the memory and executable by the processor to cause the apparatus to:

receive, at a second node of a wireless communications system, a first random access message initiating a random access procedure from a first node based at least in part on the second node being associated with a timing source, wherein the second node is a neighbor of the first node and is different from a parent node of the first node;

retrieve timing information from the timing source based at least in part on the first random access message and the random access procedure;

transmit a second random access message to the first node, the second random access message comprising the timing information from the timing source; and terminate the random access procedure prior to establishing a connection with the first node via the random access procedure based at least in part on transmitting the second random access message comprising the timing information.

30. The apparatus of claim 29, wherein the instructions to terminate the random access procedure are further executable by the processor to cause the apparatus to:

receive a third message from the first node, wherein the third message comprises a request for the termination of the random access procedure.

* * * * *